(12) United States Patent
Galimberti et al.

(10) Patent No.: US 8,236,215 B2
(45) Date of Patent: Aug. 7, 2012

(54) PROCESS AND APPARATUS FOR CONTINUOUSLY PRODUCING AN ELASTOMERIC COMPOSITION

(75) Inventors: Maurizio Galimberti, Milan (IT); Cristiano Puppi, Guanzate (IT); Francesco Romani, Sarzana (IT); Stefano Testi, Monza (IT); Enrico Albizzati, Lesa (IT)

(73) Assignee: Pirelli Pneumatici S.p.A., Milan (IT)

( * ) Notice: Subject to any disclaimer, the term of this patent is extended or adjusted under 35 U.S.C. 154(b) by 921 days.

(21) Appl. No.: 10/520,530

(22) PCT Filed: Jul. 11, 2002

(86) PCT No.: PCT/EP02/07714
§ 371 (c)(1),
(2), (4) Date: Sep. 26, 2005

(87) PCT Pub. No.: WO2004/007172
PCT Pub. Date: Jan. 22, 2004

(65) Prior Publication Data
US 2006/0108706 A1   May 25, 2006

(51) Int. Cl.
*B29C 47/00* (2006.01)
(52) U.S. Cl. .................................. 264/211; 264/37.1
(58) Field of Classification Search .............. 264/211, 264/37.1
See application file for complete search history.

(56) References Cited

U.S. PATENT DOCUMENTS

| 3,352,952 A | 11/1967 | Marr |
| 3,816,358 A | 6/1974 | Nordsiek et al. |
| 3,984,509 A * | 10/1976 | Hall et al. ............... 264/40.1 |
| 4,092,285 A | 5/1978 | Leo et al. |
| 4,153,772 A | 5/1979 | Schwesig et al. |
| 4,197,381 A | 4/1980 | Alia |
| 4,259,277 A | 3/1981 | Hill |

(Continued)

FOREIGN PATENT DOCUMENTS

DE   321 2643   10/1983

(Continued)

OTHER PUBLICATIONS

Harry Ellwood, "A Tale of Continuous Development"; European Rubber Journal, Mar. 1987, pp. 26-28.

(Continued)

*Primary Examiner* — Christina Johnson
*Assistant Examiner* — Galen Hauth
(74) *Attorney, Agent, or Firm* — Finnegan, Henderson, Farabow, Garrett & Dunner, L.L.P.

(57) ABSTRACT

A process for continuously producing an elastomeric composition includes metering and feeding at least one elastomer and at least one filler into at least one extruder, mixing and dispersing the at least one filler into the at least one elastomer using the at least one extruder, and passing the composition that results through at least one static mixer. An apparatus for continuously producing the composition includes at least one twin-screw extruder, at least one metering device, and at least one static mixer. The at least one extruder includes a housing and two screws rotatably mounted in the housing. The housing includes at least one feed opening and a discharge opening. The at least one metering device meters and feeds at least one elastomer and at least one filler into the at least one extruder. The composition discharged from the discharge opening passes through the at least one static mixer.

34 Claims, 10 Drawing Sheets

U.S. PATENT DOCUMENTS

| | | | |
|---|---|---|---|
| 4,422,810 A | 12/1983 | Boring | |
| 4,550,142 A | 10/1985 | Akita et al. | |
| 4,670,181 A | 6/1987 | Mollinger et al. | |
| 4,675,349 A | 6/1987 | Palombo et al. | |
| 4,680,330 A | 7/1987 | Berrier et al. | |
| 4,692,030 A * | 9/1987 | Tauscher et al. | 366/337 |
| 4,742,124 A | 5/1988 | Tsutsumi et al. | |
| 4,768,937 A | 9/1988 | Singh | |
| 4,804,510 A | 2/1989 | Luecke et al. | |
| 4,814,130 A * | 3/1989 | Shiromatsu et al. | 264/83 |
| 4,872,822 A | 10/1989 | Pizzorno | |
| 4,886,850 A | 12/1989 | Ogawa et al. | |
| 4,895,692 A | 1/1990 | Laurent et al. | |
| 4,897,236 A | 1/1990 | Räbiger et al. | |
| 4,962,262 A | 10/1990 | Winter et al. | |
| 4,973,627 A | 11/1990 | Mitchell | |
| 5,008,204 A | 4/1991 | Stehling | |
| 5,036,132 A | 7/1991 | Coran | |
| 5,096,867 A | 3/1992 | Canich | |
| 5,118,773 A | 6/1992 | Takao et al. | |
| 5,158,725 A | 10/1992 | Handa et al. | |
| 5,227,425 A | 7/1993 | Rauline | |
| 5,229,478 A | 7/1993 | Floyd et al. | |
| 5,240,663 A | 8/1993 | Stringaro et al. | |
| 5,246,783 A | 9/1993 | Spenadel et al. | |
| 5,262,111 A | 11/1993 | Capelle et al. | |
| 5,272,236 A | 12/1993 | Lai et al. | |
| 5,302,635 A | 4/1994 | Brinkmann et al. | |
| 5,341,863 A | 8/1994 | Sandstrom et al. | |
| 5,353,997 A | 10/1994 | Kasseck et al. | |
| 5,358,693 A | 10/1994 | Brinkmann et al. | |
| 5,374,387 A * | 12/1994 | Barnes et al. | 264/211.23 |
| 5,414,040 A | 5/1995 | McKay et al. | |
| 5,564,827 A | 10/1996 | Signer | |
| 5,573,610 A | 11/1996 | Koch et al. | |
| 5,593,747 A | 1/1997 | Georgelos | |
| 5,626,420 A | 5/1997 | Deal et al. | |
| 5,703,187 A | 12/1997 | Timmers | |
| 5,711,904 A * | 1/1998 | Eswaran et al. | 264/40.7 |
| 5,744,566 A | 4/1998 | Tsutsui et al. | |
| 5,773,053 A | 6/1998 | Song et al. | |
| 5,908,645 A | 6/1999 | Townsend et al. | |
| 6,028,143 A | 2/2000 | Mukai | |
| 6,037,418 A | 3/2000 | Mukai et al. | |
| 6,046,287 A | 4/2000 | Galimberti et al. | |
| 6,068,694 A | 5/2000 | Bernard et al. | |
| 6,075,116 A | 6/2000 | Moriwaki et al. | |
| 6,135,180 A | 10/2000 | Nohara | |
| 6,207,746 B1 | 3/2001 | Uchida et al. | |
| 6,277,916 B1 | 8/2001 | Terbrueggen et al. | |
| 6,315,019 B1 | 11/2001 | Garlaschelli et al. | |
| 6,325,956 B2 | 12/2001 | Chaudhary et al. | |
| 6,380,341 B1 | 4/2002 | Waymouth et al. | |
| 6,399,709 B1 | 6/2002 | Moriguchi et al. | |
| 6,401,779 B1 | 6/2002 | Riva et al. | |
| 6,464,607 B1 | 10/2002 | Rosenboom et al. | |
| 6,550,508 B1 | 4/2003 | Yamaguchi et al. | |
| 6,566,432 B2 | 5/2003 | Kawamura et al. | |
| 6,676,395 B2 * | 1/2004 | Bandera et al. | 425/4 C |
| 7,014,922 B2 | 3/2006 | Riva et al. | |

FOREIGN PATENT DOCUMENTS

| | | |
|---|---|---|
| DE | 196 19 509 A1 | 11/1997 |
| DE | 197 08 986 A | 9/1998 |
| EP | 0 035 342 A2 | 9/1981 |
| EP | 0 117 834 A1 | 9/1984 |
| EP | 0 129 368 A1 | 12/1984 |
| EP | 0 199 064 B1 | 10/1986 |
| EP | 0 206 794 A1 | 12/1986 |
| EP | 0 242 840 A1 | 10/1987 |
| EP | 0 277 003 A1 | 8/1988 |
| EP | 0 277 004 A1 | 8/1988 |
| EP | 0 321 852 A1 | 6/1989 |
| EP | 0 380 145 | 8/1990 |
| EP | 0 416 815 A2 | 3/1991 |
| EP | 0 418 044 A2 | 3/1991 |
| EP | 0 420 436 A1 | 4/1991 |
| EP | 0 451 604 B1 | 10/1991 |
| EP | 0 501 227 A1 | 9/1992 |
| EP | 0 514 828 A1 | 11/1992 |
| EP | 0 632 065 A1 | 1/1995 |
| EP | 0 728 797 A1 | 8/1996 |
| EP | 0 754 571 B1 | 1/1997 |
| EP | 0 827 978 A1 | 3/1998 |
| EP | 0 855 413 A1 | 7/1998 |
| EP | 0 889 091 A1 | 1/1999 |
| EP | 0 893 801 A1 | 1/1999 |
| EP | 0 928 680 A1 | 7/1999 |
| EP | 0 928 702 A1 | 7/1999 |
| EP | 0 969 040 A1 | 1/2000 |
| EP | 1 029 874 A1 | 8/2000 |
| EP | 1 031 604 B1 | 8/2000 |
| EP | 1 050 547 A1 | 11/2000 |
| EP | 1 063 246 A1 | 12/2000 |
| EP | 1 077 223 A1 | 2/2001 |
| EP | 1 110 690 | 6/2001 |
| EP | 1 211 048 A2 | 6/2002 |
| GB | 1 076 873 | 7/1967 |
| GB | 1 361 241 | 7/1974 |
| GB | 1 389 342 | 4/1975 |
| GB | 1 439 247 | 6/1976 |
| GB | 2 360 288 | 9/2001 |
| JP | 51-151744 | 12/1967 |
| JP | 49-099138 | 9/1974 |
| JP | 58-063431 | 4/1983 |
| JP | 62-297345 | 12/1987 |
| JP | 01-193324 | 8/1989 |
| JP | 04-502893 | 5/1992 |
| JP | 4-276407 | 10/1992 |
| JP | 5-032827 | 2/1993 |
| JP | 5-154835 | 6/1993 |
| JP | 7-265358 | 10/1995 |
| JP | 8-309741 | 11/1996 |
| JP | 09-277252 | 10/1997 |
| JP | 10-182894 | 7/1998 |
| JP | 10-212372 | 8/1998 |
| JP | 10-231379 | 9/1998 |
| JP | 11-60815 | 3/1999 |
| JP | 11-106573 | 4/1999 |
| JP | 2000-16009 | 1/2000 |
| JP | 2000-38477 | 2/2000 |
| JP | 2000-127711 | 5/2000 |
| JP | 2000-309637 | 11/2000 |
| JP | 2000-313205 | 11/2000 |
| JP | 2001-123026 | 5/2001 |
| JP | 2002-003659 | 1/2002 |
| JP | 2004-523642 | 8/2004 |
| RU | 2109569 | 4/1998 |
| RU | 2154949 | 8/2000 |
| SU | 1468587 | 3/1989 |
| WO | WO 92/00333 | 1/1992 |
| WO | WO 93/19107 | 9/1993 |
| WO | WO 93/25591 | 12/1993 |
| WO | WO 97/15583 | 5/1997 |
| WO | WO 98/39152 | 9/1998 |
| WO | WO 99/12997 | 3/1999 |
| WO | WO 00/24478 | 5/2000 |
| WO | WO 00/26268 | 5/2000 |
| WO | WO 00/62990 | 10/2000 |
| WO | WO 00/69930 | 11/2000 |
| WO | WO 01/12708 A1 | 2/2001 |
| WO | WO 01/49785 A1 | 7/2001 |
| WO | WO 02/083432 | 10/2002 |
| WO | WO 02/083433 | 10/2002 |

OTHER PUBLICATIONS

English language abstract of JP 09-277252.
Machine translation of JP 09-277252.
English language abstract of JP 01-193324.
English language abstract of JP 58-063431.
Advisory Action in copending U.S. Appl. No. 10/474,639 dated Aug. 29, 2007 (Ex. Harlan); (3 pages).
Brintzinger et al.; "Stereospecific Olefin Polymerization with Chiral Metallocene Catalysts", Angew. Chem. Int. Ed. Engl., vol. 34, pp. 1143-1170, (1995); (28 pages).

Burkskov, D.M., "Machines and apparatuses for rubber production," (1975); (2 pages).
Chen et al.; "'Constrained Geometry' Dialkyl Catalysts. Efficient Syntheses, C-H Bond Activation Chemistry, Monomer-Dimer Equilibration, and α-Olefin Polymerization Catalysis", Organometallics, vol. 16, No. 16, pp. 3649-3657, (1997); (9 pages).
Chen et al.; "Large Strain Stress Relaxation and Recovery Bahavior of Amorphous Ethylene-Styrene Interpolymers", Macromolecules, vol. 32, No. 22, pp. 7587-7592, (1999); (7 pages).
Chen et al.; "Organo-Lewis Acids As Cocatalysts in Cationic Metallocene Polymerization Catalysis. Unusual Characteristics of Sterically Encumbered Tris(perfluorobiphenyl)borane," J. American Chemical Society, vol. 118, No. 49, pp. 12451-12452, (1996); (2 pages).
Copending U.S. Appl. No. 10/484,494, Title: Process and Apparatus for Continuously Producing an Elastomeric Composition; Filing Date: Jul. 28, 2004; (40 pages).
Co-pending U.S. Appl. No. 10/474,430, Title: Tyre Comprising an Ethylene Copolymer, Tread Band and Elastomeric Composition Used Therein; Filing Date: Oct. 9, 2003; (41 pages).
Copending U.S. Appl. No. 10/474,639, Title: Product in Subdivided Form for Preparing Crosslinkable Elastomeric Compositions; Filing Date: May 10, 2004; (50 pages).
Declaration under 37 CFR 1.132 submitted in co-pending U.S. Appl. No. 10/474,430 dated Apr. 27, 2007 (Ex. Fischer); (8 pages).
Final Office Action issued on Jun. 18, 2010 in copending U.S. Appl. No. 10/497,999 (8 pages).
Final Office Action issued on Mar. 4, 2009 in copending U.S. Appl. No. 10/497,999 (17 pages).
Galimberti et al.; "Random Ethene/Propene Copolymerization from a Catalyst System Based on a "constrained geometry" Half-sandwich Complex", Macromol. Rapid Commun. vol. 20, No. 4, pp. 214-218, (1999); (5 pages).
Galimberti et al.; "Metallocenes as Catalysts for the Copolymerization of Ethene with Propene and Dienes", Methallocene-based Polyolefins, John Wiley & Sons, Ltd, vol. 1, Chapter 14, pp. 309-343, (1999).
Gupta et al., "Metallocene Complexes of Group 4 Elements in the Polymerization of Monoolefins" J.M.S.—Rev. Macromol. Chem. Phys., C34(3), pp. 439-514 (1994); (37 pages).
Herrmann et al.; "Synthesis and Characterization of Bridged Half-sandwich Amides of Titanium and Zirconium", Journal of Organometallic Chemistry, vol. 482, pp. 169-181, (1994); (13 pages).
Honda et al., "Olefin—aromatic viinyl compound copolymer—containing rubber compositions and their tough moldings," Chemical Abstracts, 132: 294994h of JP 2000 119,457, (1998); (1 page).
Huang et al.; "Ziegler-Natta Catalysts for Olefin Polymerization: Mechanistic Insights From Metallocene Systems", Prog. Polym. Sci., vol. 20, pp. 459-526, (1995); (68 pages).
International Preliminary Examination Report for PCT/EP02/03942 dated Jan. 22, 2003, related to U.S. Appl. No. 10/474,430; (4 pages).
International Preliminary Examination Report for PCT/EP02/03943 dated Aug. 22, 2003, related to U.S. Appl. No. 10/474,639; (14 pages).
International Preliminary Examination Report for PCT/EP02/08145 dated May 15, 2003, related to U.S. Appl. No. 10/484,494; (2 pages).
International Search Report for PCT/EP02/03942 dated Aug. 13, 2002, related to U.S. Appl. No. 10/474,430; (3 pages).
International Search Report for PCT/EP02/03943 dated Aug. 30, 2002, related to U.S. Appl. No. 10/474,639; (4 pages).
International Search Report for PCT/EP02/08145 dated Sep. 25, 2002, related to U.S. Appl. No. 10/484,494; (18 pages).
Jordan; "Chemistry of Cationic Dicyclopentadienyl Group 4 Metal-Alkyl Complexes", Advances in Organometallic Chemistry, vol. 32, pp. 325-387, (1991); (32 pages).
Kaminsky et al.; "Metallocenes for Polymer Catalysis", Advances in Polymer Science, vol. 127, pp. 143-187, (1997); (23 pages).
Longo et al.; "Copolymerization of Styrene and Ethylene in the Presence of Different Syndiospecific Catalysts", Makromol. Chem. vol. 191, pp. 2387-2396, (1990); (6 pages).
Möhring et al., "Homogeneous Group 4 metallocene Ziegler-Natta catalysts: the influence of cyclopentadienyl-ring substituents", Journal Organometallic Chemistry, 479, pp. 1-29, (1994); (29 pages).

Notice of Allowance issued in copending U.S. Appl. No. 10/497,999 (5 pages).
Office Action in co-pending U.S. Appl. No. 10/474,430 dated Jun. 8, 2007; (11 pages).
Office Action in co-pending U.S. Appl. No. 10/474,430 dated Aug. 22, 2006; (14 pages).
Office Action in co-pending U.S. Appl. No. 10/474,430 dated Sep. 19, 2008; (14 pages).
Office Action in copending U.S. Appl. No. 10/474,430 dated Feb. 11, 2008; (10 pages).
Office Action in copending U.S. Appl. No. 10/474,430 dated Oct. 17, 2007; (15 pages).
Office Action in copending U.S. Appl. No. 10/474,639 dated Dec. 12, 2007; (10 pages).
Office Action in copending U.S. Appl. No. 10/474,639 dated May 2, 2007; (14 pages).
Office Action in copending U.S. Appl. No. 10/474,639 dated Oct. 13, 2006; (9 pages).
Office Action in copending U.S. Appl. No. 10/474,639 dated Apr. 26, 2006; (9 pages).
Office Action in copending U.S. Appl. No. 10/474,639 dated Sep. 17, 2008; (10 pages).
Office Action in copending U.S. Appl. No. 10/484,494, dated Jan. 23, 2008; (17 pages).
Office Action in copending U.S. Appl. No. 10/484,494, dated Oct. 28, 2008; (20 pages).
Office Action issued on Sep. 15, 2009 in copending U.S. Appl. No. 10/497,999 (8 pages).
Oliva et al.; "Copolymerization of Ethylene and Styrene to a Nearly-Alternating Crystalline Copolymer", Macromol. Rapid Commun. vol. 17, pp. 745-748 (1996); (3 pages).
Oliva et al.; "Zirconocene-Based Catalysts for the Ethylene-Styrene Copolymerization: Reactivity Ratios and Reaction Mechanism", Macromolecules, vol. 30, No. 19, pp. 5616-5619, (1997); (4 pages).
Reply to Office Action filed on Mar. 12, 2010 in copending U.S. Appl. No. 10/497,999 (27 pages).
Request for Continued Examination and Reply to Office Action filed on Dec. 16, 2010 in copending U.S. Appl. No. 10/497,999 (10 pages).
Request for Continued Examination, Petition for Extension of Time, and Reply to Office Action filed on Aug. 26, 2009 in copending U.S. Appl. No. 10/497,999 (18 pages).
Restriction Requirement in co-pending U.S. Appl. No. 10/474,430 dated Mar. 6, 2006; (14 pages).
Shapiro et al.; "[{($\eta^5$-C$_5$Me$_4$)Me$_2$Si ($\eta^1$-NCMe$_3$)}(PMe$_3$)ScH]$_2$: A Unique Example of a Single-Component α-Olefin Polymerization Catalyst", Organometallics, vol. 9, No. 3, pp. 867-869, (1990); (3 pages).
Shapiro et al.; "Model Ziegler-Natta α-Olefin Polymerization Catalysts Derived form [{($\eta^5$-C$_5$Me$_4$)SiMe$_2$($\eta^1$-NCMe$_3$)}(PMe$_3$)Sc($\mu_2$-H)]$_2$ and [{($\eta^5$-C$_5$Me$_4$)SiMe$_2$($\eta^{1-NCMe}_3$)} Sc($\mu_2$-CH$_2$CH$_2$CH$_3$)]$_2$. Synthesis, Structures, and Kinetic and Equilibrium Investigations of the Catalytically Active Species in Solution", J. American Chemical Society, vol. 116, No. 11, pp. 4623-4640, (1994); (18 pages).
Sinn et al.; "Ziegler-Natta Catalysis", Advances in Organometallic Chemistry, vol. 18, pp. 99-149, (1980); (26 pages).
Soga et al.; "Structures of polyethylene and Copolymers of Ethylene with 1-Octene and Oligoethylene Produced with the Cp$_2$ZrCl$_2$ and [(C$_5$Me$_4$)SiMe$_2$N(t-Bu)]TiCl$_2$ Catalysts", Macromol. Chem. Phys. vol. 197, pp. 4237-4251 (1996); (8 pages).
Wild et al., "Determination of Branching Distributions in Polyethylene and Ethylene Copolymers", Journal of Polymer Science: Polymer Physics Edition, vol. 20, pp. 441-455, (1982); (15 pages).
Woo et al.; "Combined Static and Dynamic Density Functional Study of the Ti(IV) Constrained Geometry Catalyst (CpSiH$_2$NH)TiR$^+$. 1. Resting States and Chain Propagation", J. American Chemical Society, vol. 118, No. 51, pp. 13021-13030, (1996); (10 pages).
Xu et al.; "Ethylene Copolymerization with 1-Octene Using a 2-Methylbenz[e]indenyl-Based ansa-Monocyclopentadienylamido Complex and Methylaluminoxanes Catalyst", Macromolecules, vol. 31, No. 15, pp. 4724-4729, (1998); (6 pages).

* cited by examiner

PROCESS AND APPARATUS FOR CONTINUOUSLY PRODUCING AN ELASTOMERIC COMPOSITION

CROSS-REFERENCE TO RELATED APPLICATIONS

This application is a national-phase entry under 35 U.S.C. §371 from International Application No. PCT/EP2002/007714, filed Jul. 12, 2002, at the European Patent Office, the content of which is relied upon and incorporated herein by reference.

BACKGROUND OF THE INVENTION

1. Field of the Invention

The present invention relates to a process and an apparatus for continuously producing an elastomeric composition. More particularly, the present invention relates to a process and apparatus for continuously producing an elastomeric composition by means of at least one extruder, the resulting elastomeric composition being primarily, but not exclusively, intended for use in the production of tyres.

2. Description of the Related Art

Conventionally, the production of elastomeric compositions (in the following also indicated as "rubber mixtures") is performed batchwise by means of internal mixers, usually Banbury mixers having two counter-rotating rotors which exert an intensive mixing action to masticate the rubber ingredients and to incorporate and thoroughly disperse therein the other ingredients such as fillers, lubricating aids, curatives and auxiliary substances.

The compounding process using internal mixers shows many drawbacks, particularly a poor heat dissipation and thus a scarce temperature control, mainly due to an unfavourable ratio between material volume and mixer surface area. To improve dispersion in the rubber base, the various ingredients, and particularly the fillers, are incorporated into the rubber base in batches distributed in a plurality of mixing operations separated by cooling and stocking steps. Temperature sensitive ingredients, such as cross-linking agents and accelerators, are added only during the final mixing step after cooling the rubber mixture below a predetermined temperature (usually below 110° C.) to avoid scorching.

Therefore, the compounding process in internal mixers, although still remaining the most widely used mixing process in the rubber industry, is time and energy consuming and does not guarantee an effective control on the characteristics of the resulting elastomeric compositions, particularly as regards dispersion homogeneity of fillers into the rubber base. Variation in the added amounts of individual ingredients, timing of addition and discharge from the mixers, initial temperature of the raw materials, and fluctuations of shear forces inside the material during mixing, all contribute to batch-to-batch variation.

To overcome the limitations of the discontinuous processes, many attempts have been performed by the rubber industry to set up continuous compounding processes, based on extrusion techniques analogous to those commonly employed in the processing of thermoplastic polymer materials. Continuous mixing processes carried out by means of an extruder should improve uniformity in the rubber mixture characteristics, better thermal management resulting from improved surface-to-mass ratios, and possible development of highly automated operations. For an overview on this subject see the article "A tale of continuous development" by H. Ellwood, published in *European Rubber Journal*, March 1987, pages 26-28.

U.S. Pat. No. 4,897,236 discloses a process and an apparatus for continuously producing a rubber mixture, wherein the ingredients of the mixture are fed, masticated and homogenized in a twin-screw extruder. The resulting mixture is divided into a first and a second portion. The first portion is discharged, while the second portion is recycled for further homogenization and for mixing with fresh batches of the ingredients being fed into the extruder. The recycled portion is circulated to and returned from a cooled, annular chamber exterior to the extruder chamber, said annular chamber having outflow and inflow passages communicating with the interior of the extruder. That partial recycling of the rubber mixture should compensate for fluctuations in the metering of the ingredients and for local inhomogeneities which may occur. Moreover, the intensive cooling of the recycled portion in the annular chamber should correct a rising processing temperature, and should improve the dispersing action because of increased shearing stresses consequent to the temperature decrease.

U.S. Pat. No. 5,302,635 discloses a method and apparatus for continuously producing a rubber composition. In a first step, crude rubber is continuously fed into a twin-screw extruder, added with non-reactive additives (oils and fillers) and the resulting mixture is plasticated and homogenized by the extruder screws. During that first step, the mixture is kept at a temperature of from 100° C. to 160° C. Then, in a second step, the resulting mixture is cooled to a temperature of from 100° C. to 120° C. and reactive additives (particularly sulfur and vulcanization accelerators) are fed and incorporated into the rubber mixture. The homogenized rubber composition then leaves the extruder via the extruder outlet opening.

The process can be carried out according to different extruder configurations. For instance, the two mixing steps can be performed in a single twin-screw extruder having two distinct mixing zones operating at two different temperatures. Alternatively, the first step may be carried out in a first twin-screw extruder operating at 100° C.-160° C.; the resulting base composition is then fed directly to a second twin-screw extruder operating at 100° C.-120° C. According to another embodiment, the process may be performed in a single extruder having two screw pairs driven at mutually opposite ends of the extruder housing, the two screw pairs operating at different temperatures.

U.S. Pat. No. 5,158,725 discloses a method for continuously producing elastomer compositions which comprises: feeding an elastomer into a twin-screw extruder; feeding at least one filler, oil and/or other elastomers into the extruder; mixing the ingredients to provide a homogeneous mixture which is maintained at a Mooney viscosity ML(1+4) at 100° C. between 20 and 250 during mixing; discharging the resulting mixture from the extruder. Precise volumetric or loss-in-weight feeders are used to meter the elastomer and other ingredients into the extruder. After leaving the extruder, the compounded rubber may be extruded through a die, calendered into sheets, strips or strands, or may be pelletized. The continuous method is less expensive than the multi-step batchwise processes currently used in the art and requires less manpower and less material handling. Moreover, improved dispersion and homogeneity of the resulting elastomeric compositions would result.

U.S. Pat. No. 5,262,111 discloses a process for the continuous production of a rubber composition in a twin-screw extruder. Rubber is fed into the extruder together with a processing aid and masticated up to a temperature of 120° C.

to 180° C. Subsequently, a first part of carbon black, representing preferably 40-80% of the whole quantity of carbon black, is fed into the heated extrudate. Afterwards, plasticizing oil is added to the extrudate before the second remaining carbon black part is fed and incorporated into the extrudate at a temperature of from 120° C. to 180° C. The whole composition is then cooled to a temperature of from 100° C. to 120° C., a crosslinking agent is added, and the composition is homogenized and extruded. The process would improve the dispersion of carbon black in the extrudate while reducing the specific energy requirement.

U.S. Pat. No. 5,626,420 discloses a continuous mixing process and apparatus, wherein base elastomer(s) and other components are continuously dosed and introduced into a mixing chamber formed of a stator and a rotor rotating therein, preferably a single screw extruder. The introduced components advance within the mixing chamber along zones of propulsion and mixing. To improve dispersion and homogenization of the rubber components, the filling rate of the mixing chamber in at least certain mixing zones is lower than 1. To properly introduce the components, and particularly the rubber base, into the mixing chamber, force feeding means are used, such as volumetric pumps (e.g. gear pumps). To obtain precise dosage of the different components, it may be desirable to add the components in a mixing zone where the filling rate is equal to 1, located between two mixing zones having a filling rate lower than 1.

U.S. Pat. No. 5,374,387 describes a process for continuously producing elastomeric compositions using a twin-screw extruder, which comprises the following sequential steps. In a first mixing zone of the extruder an elastomeric material is added, sheared and heated to a first operating temperature (typically from 130° C. to 220° C.) while reducing viscosity. Then the elastomeric material is passed in a second mixing zone where it is added with at least a first portion of a reinforcing filler and processing aid, while simultaneously cooling the rubber mixture to a second operating temperature (typically from 110° C. to 160° C.). The resulting mixture is then passed to an optional third mixing zone, where small constituent chemicals, such as adhesion promoters, anti-ozonants, color additives, fire retardants and the like, are introduced into the rubber mixture. Preferably, in said third mixing zone a second portion of the reinforcing filler and processing aid is added so as to reach a third operating temperature (typically from 85° C. to 130° C.). Then, in a fourth mixing zone the rubber mixture is supplemented with the vulcanization agent at a fourth operating temperature (typically from 115° C. to 150° C.). The mixture flow is then directed through a delivery zone (fifth zone) wherein the mixture flow is extruded into the desired form through some sort of die slot or the like. The various components of the rubber composition are continuously and individually metered to the extruder, preferably in the form of particulated materials and/or liquids by means of weight loss feeders.

U.S. Pat. No. 5,711,904 discloses a method for continuous mixing of elastomeric compositions reinforced with silica. A twin-screw extruder is fed with the elastomeric material, then with silica and other compounding ingredients, including a silica coupler. Temperature and pressure along the extruder are controlled to enable the silica coupler to react with the silica and the elastomeric material. Then curatives and accelerators are added, while maintaining the mixture at a Mooney viscosity ML(1+4) at 100° C. between 20 and 250. The mixing is continued for a time sufficient to thoroughly mix the curatives and accelerators. The resulting elastomeric composition is then forced through a suitable die mounted at the extruder exit. The overall process may be performed using a single extruder or a sequence of extruders. Preferably, residence time is increased in a first twin-screw extruder and then the composition is cooled, ground and dumped into a second twin-screw extruder where the rubber mix is completed with curatives and other ingredients. The different extruders may be separate independent entities or may be coupled to each other to form one continuous process. The extruders may be closely coupled in a cross-head extruder mounting, or may be more loosely connected, for instance via festoons or belts that convey the material from one unit to the other.

SUMMARY OF THE INVENTION

The Applicant has noted that, in a process for continuously producing an elastomeric composition by means of at least one extruder, the resulting elastomeric composition may not have a uniformity of properties as would be expected taking into account the very good control of the processing conditions achievable during extrusion.

In particular, the Applicant has noted that the mixing performance of the extruder is limited by the introduction of the temperature sensitive minor ingredients which require a very strict control of the temperature into the extruder to avoid scorching. Moreover, said temperature sensitive minor ingredients are generally introduced into the extruder's barrel in correspondence of the end zone thereof. Therefore, they are not sufficiently mixed together and uniformly homogenized with the plurality of ingredients to be compounded.

In particular, the Applicant has noted that the resulting elastomeric composition exiting from a continuous production process is not satisfactory in terms of consistency (i.e. of uniformity) of the physical-chemical properties, said properties varying from sample to sample even within the same production campaign causing a corresponding variation of performance in the finished product.

The Applicant has noticed that the above considerations are of particular relevance when applied to the so called "minor ingredients", i.e. to those components which are different from rubbers, reinforcing fillers and plasticizing agents and which are added to modify and/or to improve the characteristics of the elastomeric compositions. Some examples of said minor ingredients are: crosslinking agents, crosslinking accelerators, crosslinking retardants, crosslinking activators, protective agents, hardening resins, adhesion promoters, coupling agents, condensation catalysts.

The addition to the rubber base of the minor ingredients, types and amounts of which vary according to the elastomeric composition to be produced, is particularly critical since the minor ingredients are very numerous (usually at least 5-15 in a single rubber mixture) and used in little amounts (generally not greater than 5% by weight with respect to the total weight of the rubber mixture). Therefore, a very accurate distribution and uniform homogenization of said minor ingredients are rather difficult to be achieved.

The Applicant has now found that an excellent uniformity of the physical-chemical properties of the elastomeric composition exiting from the extrusion apparatus can be obtained by providing the production process with a mixing step to be carried out in a static mixer.

Therefore, in a first aspect the present invention relates to a process for continuously producing an elastomeric composition, said process comprising the steps of:
  metering and feeding into at least one extruder at least one elastomer and at least one filler;
  mixing and dispersing said filler into said elastomer by means of said extruder, and
  passing the resulting elastomeric composition through at least one static mixer.

The Applicant has found that said step passing the resulting elastomeric composition through a static mixer, wherein a further mixing step is carried out, advantageously ensure the reproducibility of the physical-chemical properties of said resulting elastomeric composition.

In accordance with a preferred embodiment, the process of the present invention comprises the steps of discharging the resulting elastomeric composition from said extruder and cooling said composition before the step of passing the latter through a static mixer.

Preferably, said extruder is a twin-screw extruder.

According to a preferred embodiment, the process of the present invention comprises the steps of metering and feeding into said extruder at least one minor ingredient which is mixed and dispersed into said elastomer by means of said extruder.

Preferably, the minor ingredients metered and fed into said extruder do not include temperature sensitive minor ingredients.

According to a further embodiment, the process of the present invention comprises the step of adding at least one minor ingredient to the resulting elastomeric composition discharged from the extruder.

Preferably, said step of adding is carried out after said step of cooling.

Preferably, the temperature sensitive minor ingredients are added to the resulting elastomeric composition discharged from the extruder. This is particularly advantageous since the working conditions of the extruder are not limited by the temperature sensitive minor ingredients. In particular, the absence of said temperature sensitive minor ingredients during the steps of mixing and dispersing does not limit the maximum temperature which can be reached within the extruder.

Preferably, the minor ingredients are fed into the extruder or added to the resulting elastomeric composition discharged from the extruder in the form of a subdivided product. According to the present invention, the term "subdivided product" refers to a product in discrete particles. Preferably, said particles have average dimensions of from 0.5 mm to 15 mm, more preferably from 1 mm to 10 mm, even more preferably from 3 mm to 7 mm. Preferably, said particles are in the form of granules, pellets, beads or pearls.

Alternatively, the minor ingredients are fed into the extruder or added to the resulting elastomeric composition discharged from the extruder in the form of a powder.

Alternatively, the minor ingredients are fed into the extruder or added to the resulting elastomeric composition discharged from the extruder in the form of a liquid.

Alternatively, the minor ingredients are fed into the extruder or added to the resulting elastomeric composition discharged from the extruder in the form of a masterbatch.

Advantageously, said masterbatch can be obtained by mixing and dispersing, preferably into an additional extruder, at least one minor ingredient and a predetermined amount of the resulting elastomeric composition discharged from the extruder.

The masterbatch resulting from said additional extruder can be obtained in the form of a continuous ribbon or, alternatively, in the form of a subdivided product.

According to a preferred embodiment, the process of the present invention further comprises the step of obtaining a subdivided product from the resulting elastomeric composition discharged from the extruder.

According to a preferred embodiment, said step of obtaining a subdivided product from the resulting elastomeric composition discharged from said extruder is carried out at the discharge opening of said extruder so that the extrudate is obtained directly in the subdivided form.

According to a further embodiment, said step of obtaining a subdivided product from the resulting elastomeric composition discharged from said extruder is carried out after said step of cooling.

According to a further embodiment, the process of the present invention further comprises the steps of:
  accumulating an amount of said subdivided product obtained from the resulting elastomeric composition discharged from said extruder, and
  stirring said accumulated amount of subdivided product.

The Applicant has perceived that accumulating and stirring for a predetermined period of time an amount of elastomeric extrudate in the form of a subdivided product, e.g. by means of a rotating drum, compensate for any possible fluctuations in the metering step of the various ingredients as well as for any local inhomogeneities which may occur during the production process. The Applicant has noted that said inhomogeneities, i.e. the lack of consistency of the physical-chemical properties mentioned above, are mainly due to fluctuations which may occur during the metering of the plurality of ingredients which are added to produce the elastomeric composition. The Applicant has found that said accumulating and stirring steps allow to mechanically homogenize subdivided products which are obtained at different moments of the production process so that any possible fluctuations occurred during the metering and feeding steps can be advantageously compensated.

According to a preferred embodiment, said steps of accumulating and stirring are carried out after said step of obtaining a subdivided product from the resulting elastomeric composition discharged from said extruder.

According to a further embodiment, the steps of accumulating and stirring are carried out also on the subdivided product obtained from at least one minor ingredient.

According to a further embodiment, the step of adding at least one minor ingredient to the resulting elastomeric composition discharged from the extruder is carried out before said steps of accumulating and stirring.

Alternatively, the step of adding at least one minor ingredient to the resulting elastomeric composition discharged from the extruder is carried out after said steps of accumulating and stirring.

According to a preferred embodiment of the present invention the discharging of the stirred subdivided product is carried out continuously.

According to a further embodiment, the discharging of the stirred subdivided product is performed batchwise at the end of the stirring step by means of at least two stirring devices which are arranged in series so that while a first one is stirring, a second one is loaded with or unloaded from the subdivided product.

According to a preferred embodiment, the process of the present invention further comprises a discharging step of the elastomeric composition passed through said static mixer. Preferably, said discharging step is carried out continuously. Alternatively, said discharging step is carried out batchwise.

According to a preferred embodiment of the present invention, the resulting elastomeric composition is cooled down to prevent scorching. Preferably, the resulting elastomeric composition, discharged from the extruder, is cooled down by air at room temperature contacting said elastomeric composition during the transfer thereof towards the successive operating unit. Alternatively, said step of cooling is carried out by using any cooling device known in the art such as, for instance, a cooled conveyor belt, a cooled air flow directed onto the resulting elastomeric composition, or causing the latter to pass into a cooling conduit containing a coolant (typically water) and successively to dry by hot air. Preferably, said elastomeric composition is cooled down at a temperature not higher than 110° C., more preferably at a temperature ranging from 20° C. to 90° C., even more preferably from 25° C. to 80° C.

In a second aspect the present invention relates to an apparatus for continuously producing an elastomeric composition, said apparatus comprising:
- at least one twin-screw extruder comprising a housing and two screws rotatably mounted in said housing, said housing including at least one feed opening and a discharge opening;
- at least one metering device to meter and feed into said extruder at least one elastomer and at least one filler, and
- at least one static mixer for passing through the resulting elastomeric composition discharged from said discharge opening of said extruder.

According to an embodiment of the present invention, said static mixer is positioned at the discharge opening of said extruder.

According to a further embodiment of the present invention, said static mixer is positioned downstream of said extruder.

According to a preferred embodiment of the present invention, said apparatus comprises at least one further metering device to meter and feed into said extruder at least one minor ingredient. Preferably, the minor ingredients fed into the extruder do not include the temperature sensitive minor ingredients.

According to a preferred embodiment of the present invention, said apparatus comprises at least one further metering device to meter add at least one minor ingredient to the resulting elastomeric composition discharged from the discharge opening of the extruder. Preferably, the temperature sensitive minor ingredients are added to the resulting elastomeric composition discharged from the extruder.

According to a preferred embodiment of the present invention, said apparatus comprises at least one cooling device upstream of the static mixer.

According to a preferred embodiment of the present invention, said apparatus further comprises at least one device for obtaining a subdivided product from the resulting elastomeric composition discharged from the discharge opening of the extruder. Preferably, said device for obtaining a subdivided product from the resulting elastomeric composition is positioned at the discharge opening of the extruder so that the extrudate is obtained directly in the subdivided form.

Alternatively, said device is positioned downstream of said extruder. Preferably, said device is a granulator or an open mill.

According to a preferred embodiment of the present invention, said apparatus further comprises at least one stirring device for mixing the accumulated subdivided product obtained from the resulting elastomeric composition discharged from the extruder.

Preferably, said stirring device is positioned upstream of the static mixer. Preferably, said stirring device is a rotating drum.

According to a preferred embodiment of the present invention, said metering devices of the apparatus according to the present invention are gravimetric feeders.

According to a preferred embodiment, the elastomeric composition is fed into at least one static mixer by means of a feeding and pumping device. Said feeding and pumping device provides said composition with the pressure which is necessary for causing it to pass through the static mixer.

According to an embodiment of the present invention, said feeding and pumping device is positioned upstream of the static mixer. Preferably, said feeding and pumping device is a gear-pump.

According to a further embodiment, said feeding and pumping device is positioned at a feed opening of said static mixer. Preferably, said feeding and pumping device is a gear-pump or a single-screw extruder or a reciprocating screw, or combinations thereof. Particularly preferred is the combination single-screw extruder and gear-pump.

According to a preferred embodiment, the apparatus of the present invention further comprises at least one filtering body positioned upstream of the discharge opening of the extruder.

BRIEF DESCRIPTION OF THE DRAWINGS

The present invention is now further illustrated with reference to the attached figures wherein.

DETAILED DESCRIPTION OF THE EXEMPLARY EMBODIMENTS

For simplicity of description, in the appended drawings, the same reference signs correspond to similar or identical components.

Figure 1:
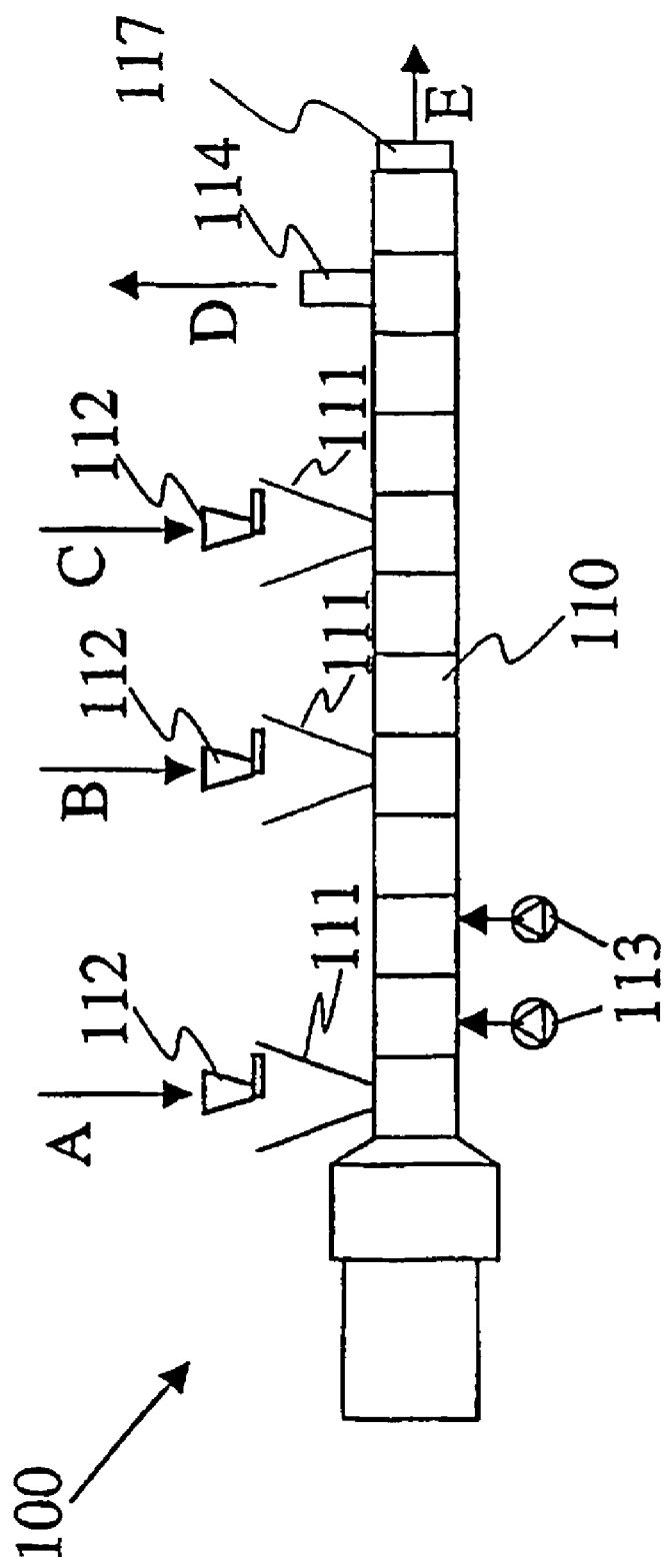
FIG. 1 is a schematic diagram of a traditional plant for producing an elastomeric composition.

FIG. 1 shows a schematic diagram of a production plant 100 of an elastomeric composition according to the prior art.

Said production plant 100 comprises an extruder 110 suitable for producing a continuous ribbon (or rod) E of the desired elastomeric composition. As schematically shown in FIG. 1, by means of feed hoppers 111 the extruder 110 is fed with the recipe ingredients necessary for producing said desired elastomeric composition, said ingredients typically comprising: rubber base materials, reinforcing fillers and minor ingredients as defined above.

Generally, the recipe ingredients are fed to different zones of the extruder. For example, FIG. 1 shows three main flows A, B, C in correspondence of three different zones of the extruder 110, the number of said flows depending on the elastomeric composition to be produced.

Furthermore, generally some recipe ingredients are fed to the extruder more than once, for instance the same recipe ingredient can be fed to two distinct zones of the extruder, once again depending on the elastomeric composition to be produced. Therefore, each flow A, B, C of FIG. 1 can comprise more than one recipe ingredient. That is the case, for instance, of the reinforcing fillers (e.g., carbon black, silica) which are preferably introduced at different zones of the extruder so as to improve their dispersion in the rubber base.

According to said embodiment, the temperature sensitive minor ingredients are introduced into the extruder 110 in correspondence of the last feed hopper thereof.

For simplicity, FIG. 1 shows only one metering device 112 for each flow A, B, C. However, in the case each flow comprises more than one recipe ingredient, preferably each recipe ingredient is provided with a dedicated metering device. In that way, metering errors which can occur due to the metering of recipe ingredients of different densities can be advantageously reduced.

Alternatively, a plurality of different recipe ingredients may be metered by means of the same metering device.

Preferably, the metering device 112 is a loss-in-weight gravimetric feeder.

Generally, the rubber base materials, which are usually provided by manufacturers in bales, are comminuted in irregular particles (crumbs) of small size (about 3-50 mm as average dimensions), e.g. by means of blades, and then supplemented with an antisticking agent (e.g. chalk, silica, or other powders) to avoid reagglomeration.

Furthermore, gravimetrically controlled feeding pumps 113 are also provided to introduce into the extruder 110 plasticizing oils and possibly other liquid ingredients, such as silica coupling agents (e.g. silanes), adhesion promoters (e.g. cobalt salts), liquid resins (e.g. phenolic resins) and anti-reversion agents (e.g. silanes), which are generally added to the rubber base.

FIG. 1 shows also a flow D exiting from the extruder 110 which is generally provided with a degassing unit schematically indicated by reference sign 114.

Preferably, the extruder 110 is a co-rotating twin-screw extruder.

With reference to FIG. 1, the elastomeric composition is discharged from the extruder 110 by passing it through an extruder die 117 so that the elastomeric composition is obtained in the form of a continuous elastomeric ribbon E.

Figure 2:
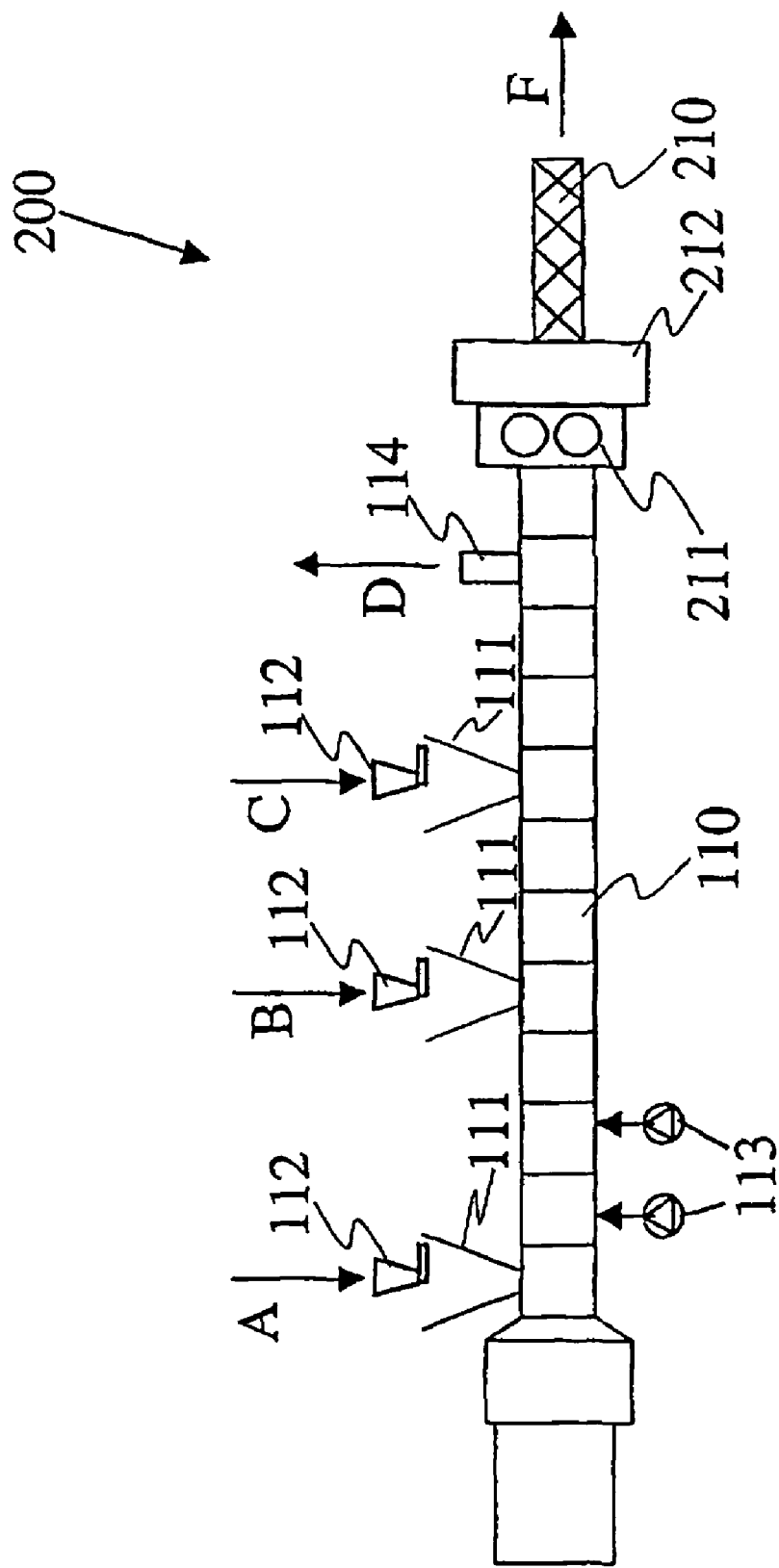
FIGS. 2 to 10 are schematic diagrams of different embodiments of a continuous production plant of an elastomeric composition according to the present invention.

FIG. 2 shows a first embodiment of a continuous production plant 200 according to the present invention, said plant 200 comprising the extruder 110 as described with reference to FIG. 1.

According to said embodiment, the elastomeric composition is filtered to eliminate any possible aggregate, metal particles or other impurities. To that purpose, a filtering body 212 (e.g. a screen filter) is placed downstream of the extruder screw (not shown). During said filtering phase of the elastomeric composition particular care should be taken to avoid temperature raising which could cause scorching of the elastomeric composition.

In order to impart to the extruded material a pressure sufficient to pass said filtering body 212, preferably the extruder 110 is provided with a gear pump 211. Preferably, said gear pump 211 is placed upstream of the filtering body 212.

Preferably, said extruder 110 is a twin-screw extruder. Preferably, the screws of the extruder 110 are co-rotating. Preferably, said co-rotating intermeshing twin-screw extruder has a L/D ratio of 48.

According to said embodiment the continuous production plant 200 of the present invention further comprises a static mixer 210 which is positioned at the discharge opening of the extruder 110. According to the present invention, the static mixer 210 carries out homogenizing and mixing actions in order to confer to the elastomeric composition a desired consistency of the physical-chemical properties thereof. The elastomeric composition is discharged from the static mixer 210 in the form of a continuous elastomeric ribbon F.

The static mixer which can be used in the process according to the present invention is generally a blending device, which is known per se in the art, containing no moving parts, in which the blending action is obtained by forcing the elastomeric composition to be blended to pass through stationary blending elements. By diverting the direction of the flow or constraining this flow to pass through preferred channels, said blending elements carry out numerous subdivisions and recombinations of the flow, thus making it possible to obtain the desired uniformity of properties within the elastomeric composition leaving the mixer. The static mixer is preferably a device which is specially designed for blending highly viscous fluids and commonly used in processes of injection-moulding of plastics, for example a static mixer as disclosed in U.S. Pat. No. 5,564,827. In general, this type of mixer comprises static blending elements in a single piece, that is to say without welds or joints, so as to avoid as far as is possible any deformations and/or ruptures inside the mixer, even when the material to be blended is highly viscous and thus requires high extrusion pressures.

Figure 3:
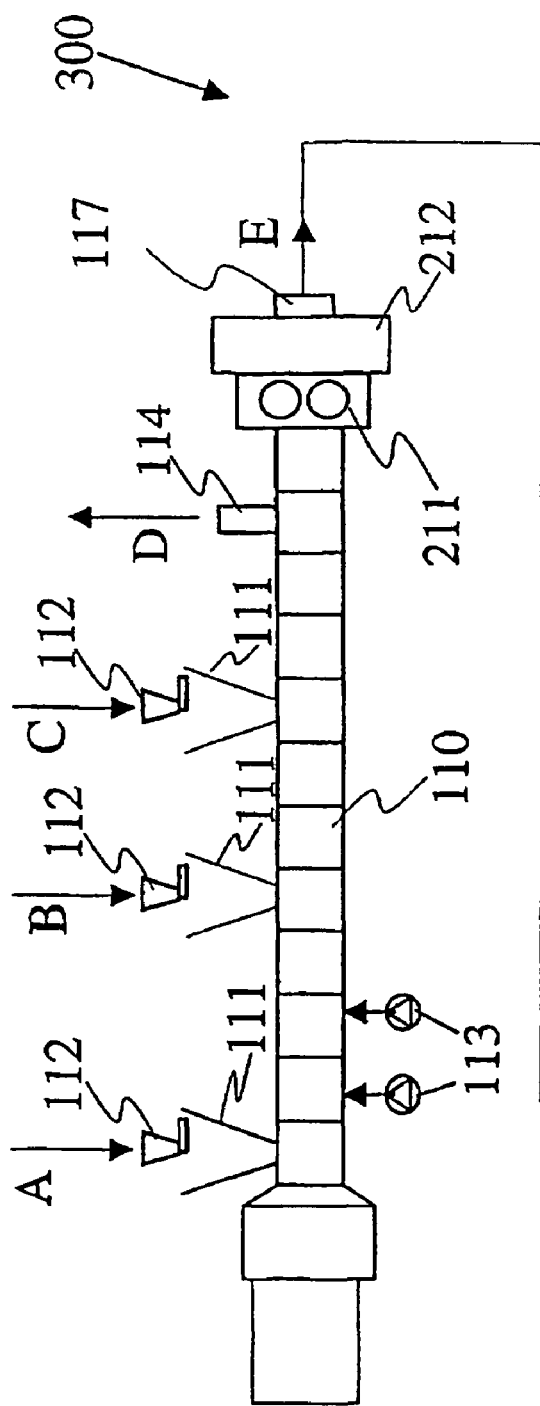
Figure 3:
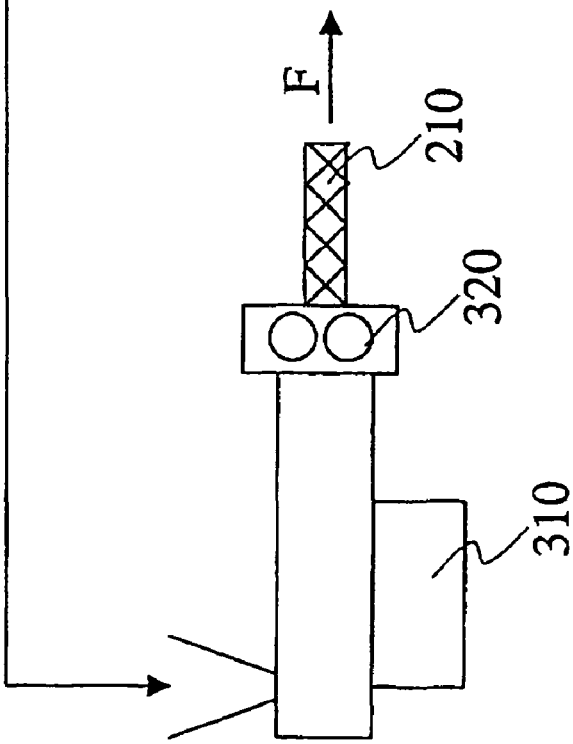

FIG. 3 shows a second embodiment of a continuous production plant 300 according to the present invention, said plant 300 comprising the extruder 110 as described with reference to FIG. 1.

Preferably, the elastomeric ribbon E exiting from the extruder 110 is cooled down at a temperature not higher than 110° C. thanks to the air at ambient temperature surrounding said elastomeric ribbon during the conveying thereof to the successive operating units, by means of any suitable device (e.g., a conveyor belt).

According to said embodiment the continuous production plant 300 of the present invention further comprises a static mixer 210 which is positioned downstream of the extruder 110. The static mixer 210 is fed with the elastomeric ribbon E by means of a feeding and pumping device 310 and a gear pump 320 respectively. In order to impart to said elastomeric composition E a pressure sufficient to pass through the static mixer 210, said elastomeric composition is fed to the feeding and pumping device 310 which, in turn, feeds the gear-pump 320 placed downstream of said feeding and pumping device 310.

Preferably, said feeding and pumping device 310 is a single-screw extruder which is particularly preferred for feeding the gear-pump 320 since a single-screw extruder does not cause the elastomeric composition to remarkably increase the temperature thereof.

Finally, the elastomeric composition is discharged from the static mixer 210 in the form of a continuous elastomeric ribbon F.

Figure 4:
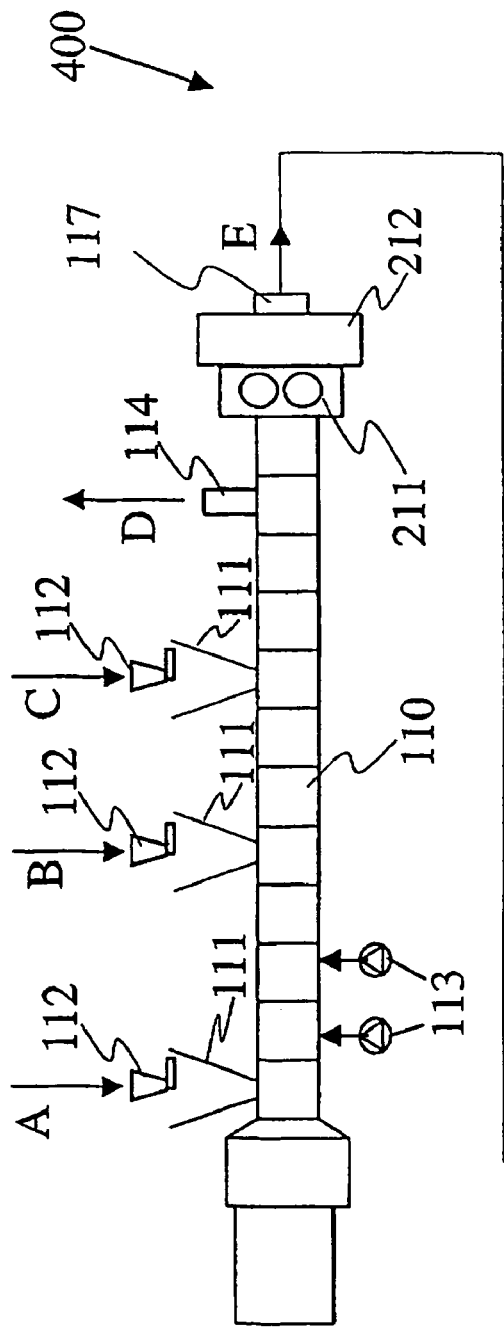
Figure 4:
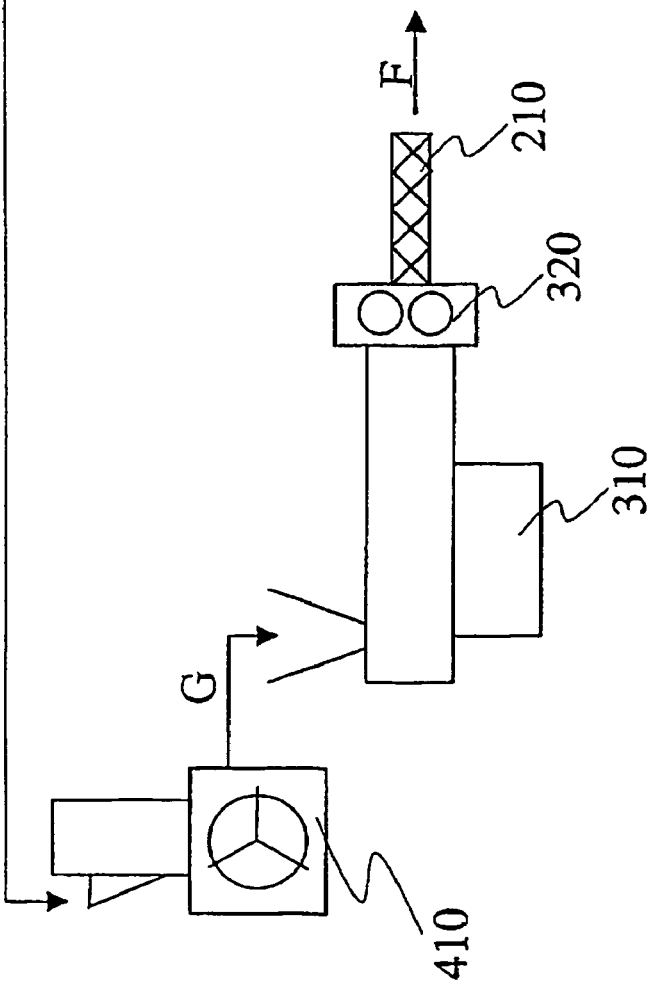

FIG. 4 shows a further embodiment of a continuous production plant 400 of the present invention according to which the elastomeric ribbon E exiting from the extruder 110 is conveyed, by means of any suitable device (e.g., a conveyor belt), to a grinding device 410 that transforms the elastomeric ribbon E into an elastomeric subdivided product G.

Preferably, said grinding device 410 is a grinding mill or a granulator.

According to said further embodiment, the elastomeric subdivided product G is successively fed to the single-screw extruder 310 as disclosed above with reference to the continuous production plant 300 of FIG. 3.

Figure 5:
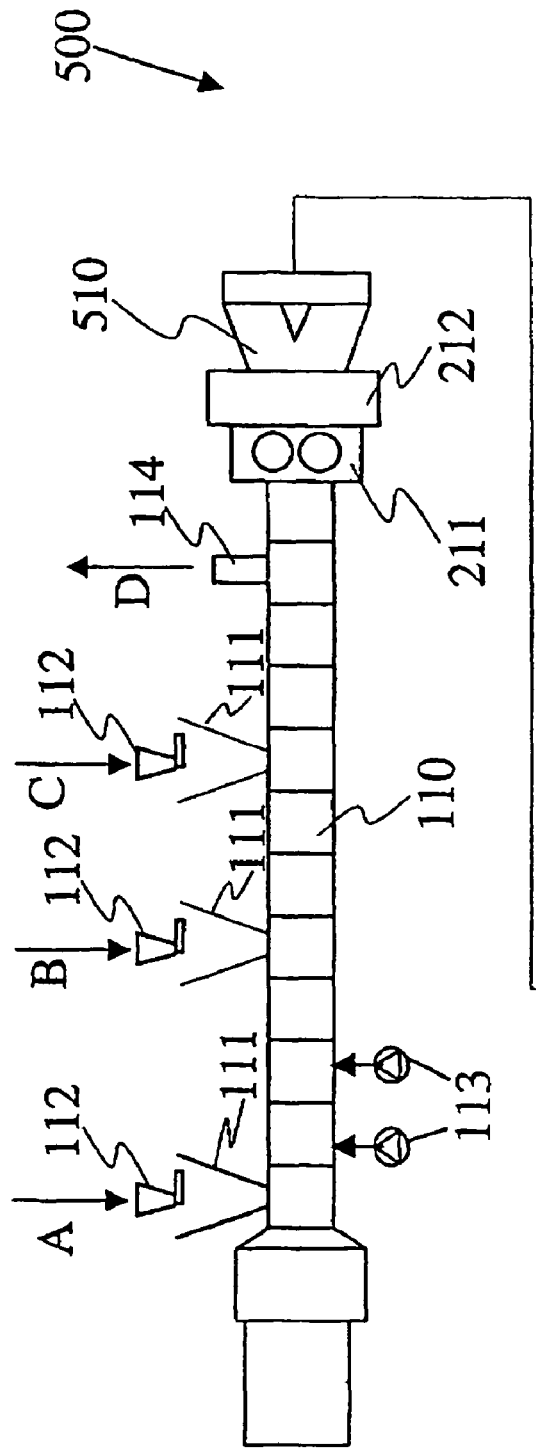
Figure 5:
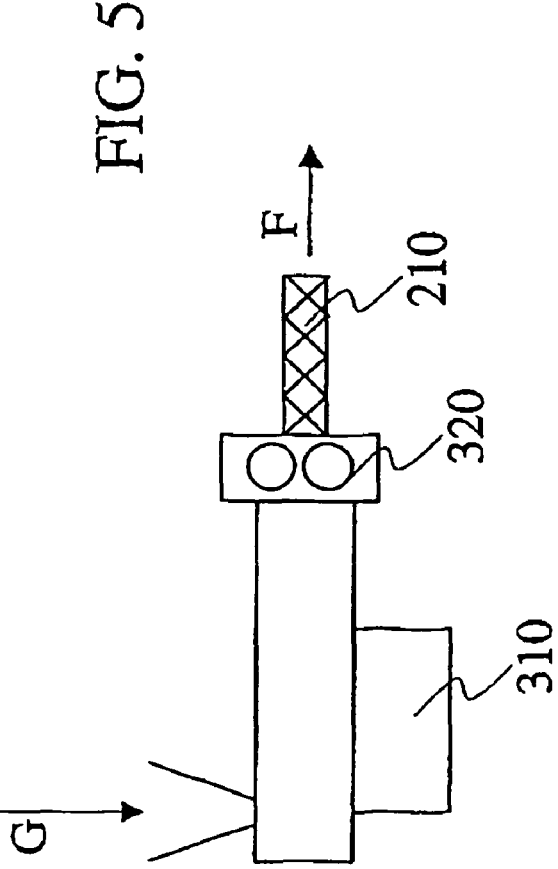

FIG. 5 shows a further embodiment of a continuous production plant 500 of the present invention according to which the step of obtaining an elastomeric composition in the subdivided form is carried out directly at the discharging opening of the extruder 110 so that the grinding device 410 of FIG. 4 can be avoided.

For example, according to said further embodiment the elastomeric composition can be granulated at the end of the extrusion step by providing the extrusion head with a perforated die plate 510 through which the elastomeric composition is caused to pass.

The die plate 510 is generally equipped with cutting means (not shown in FIG. 5) so that the elastomeric composition can be obtained in the granular form.

Analogously to the production plant 400 shown in FIG. 4, the elastomeric composition in the subdivided form G is successively fed to the single-screw extruder 310, as mentioned above.

According to a further embodiment of the present invention, the minor ingredients or part thereof (preferably the temperature sensitive minor ingredients) re added to the resulting elastomeric composition discharged from said at least one extruder.

According to an embodiment of the present invention, the extruder 110 is fed with rubber base materials, reinforcing fillers and minor ingredients which are not temperature sensitive (such as crosslinking agents, crosslinking accelerators, crosslinking retardants and crosslinking activators) and, therefore, do not degrade and/or cause scorching at the operating conditions and/or do not interfere with the compounding process.

Alternatively, a predetermined amount of said temperature sensitive minor ingredients is added to said resulting elastomeric composition while the remaining part thereof is introduced into the extruder directly.

Figure 6:
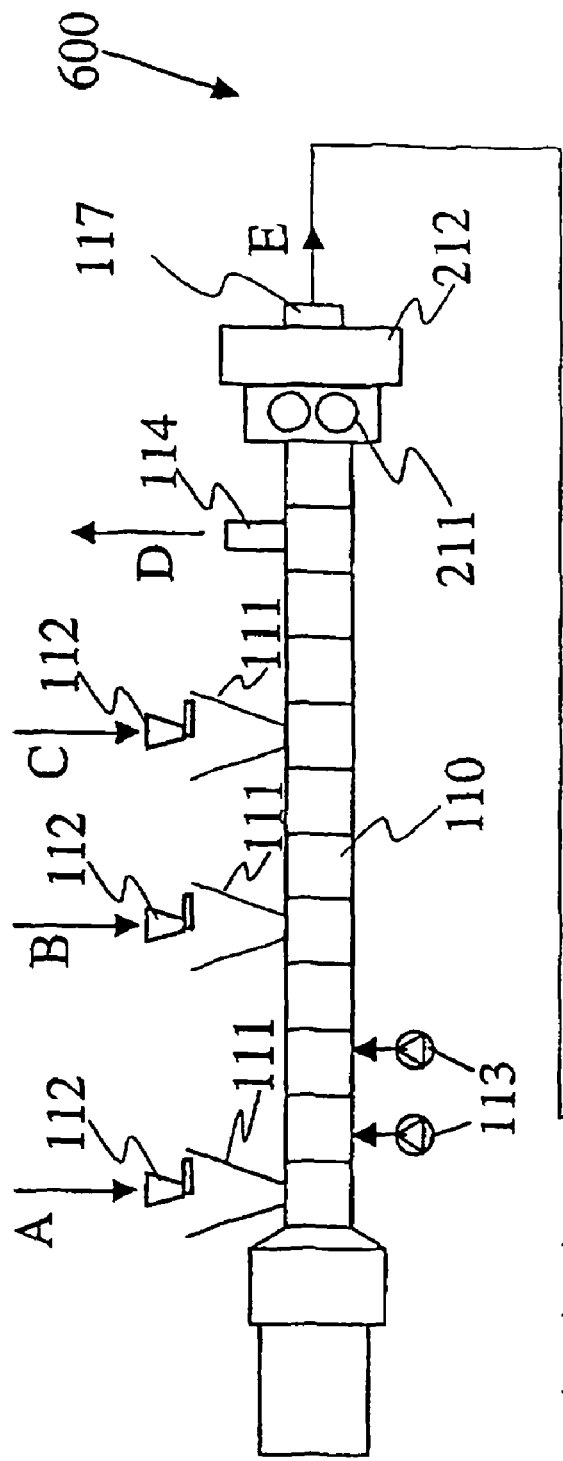
Figure 6:
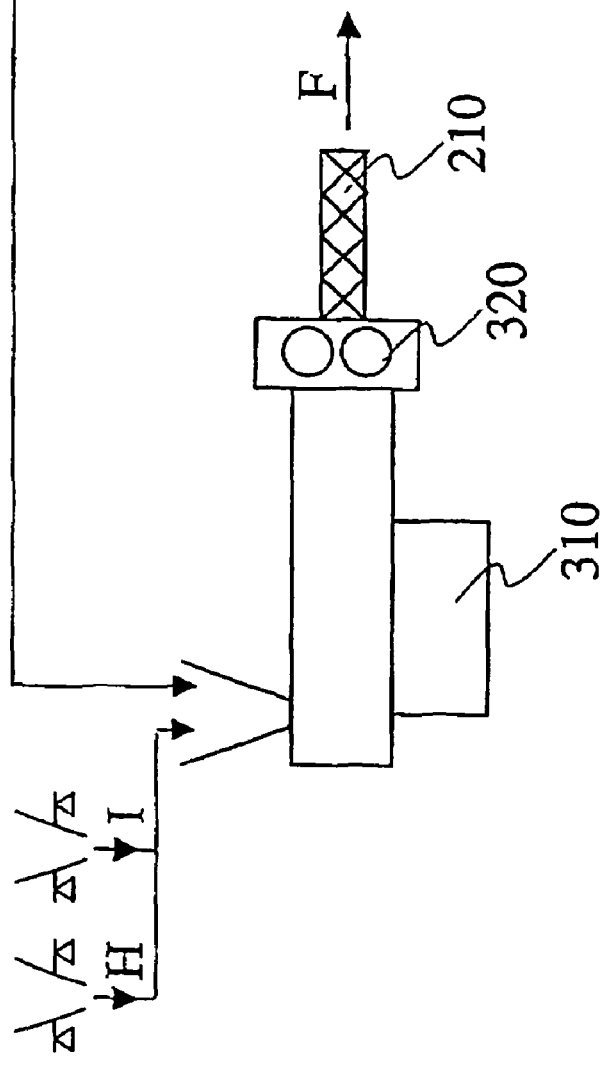

FIG. 6 shows an embodiment of a continuous production plant 600 of the present invention according to which the minor ingredients, or at least part of them, are added as masterbatches to the resulting elastomeric composition discharged in the form of the elastomeric ribbon E from the extruder 110. In FIG. 6 two masterbatches H, I of two minor ingredients are shown as a non-limitative example of the present invention.

Preferably, said masterbatches are obtained by mixing and dispersing into an additional extruder (not shown) at least a predetermined amount of the resulting elastomeric composition discharged from the extruder 110 and at least one minor ingredient.

According to an embodiment of the invention, each masterbatch includes one minor ingredient. Preferably, said minor ingredient is a temperature sensitive minor ingredient.

According to a further embodiment, each masterbatch includes a mixture of at least two minor ingredients.

In a preferred embodiment, the continuous production plant 600 further comprises the devices which are necessary for producing said masterbatches in situ. Alternatively, said masterbatches are produced apart from the continuous production plant 600.

As shown in FIG. 6, after being metered (e.g. by means of any suitable metering device such as a loss-in-weight gravimetric feeder), the masterbatches H, I are introduced into the feed hopper of the single-screw extruder 310 together with the elastomeric ribbon E discharged from the extruder 110 and the process is successively carried out as described above with reference to FIGS. 3 to 5.

According to a further embodiment of the present invention, the continuous production plant further comprises a stirring device.

Figure 7:
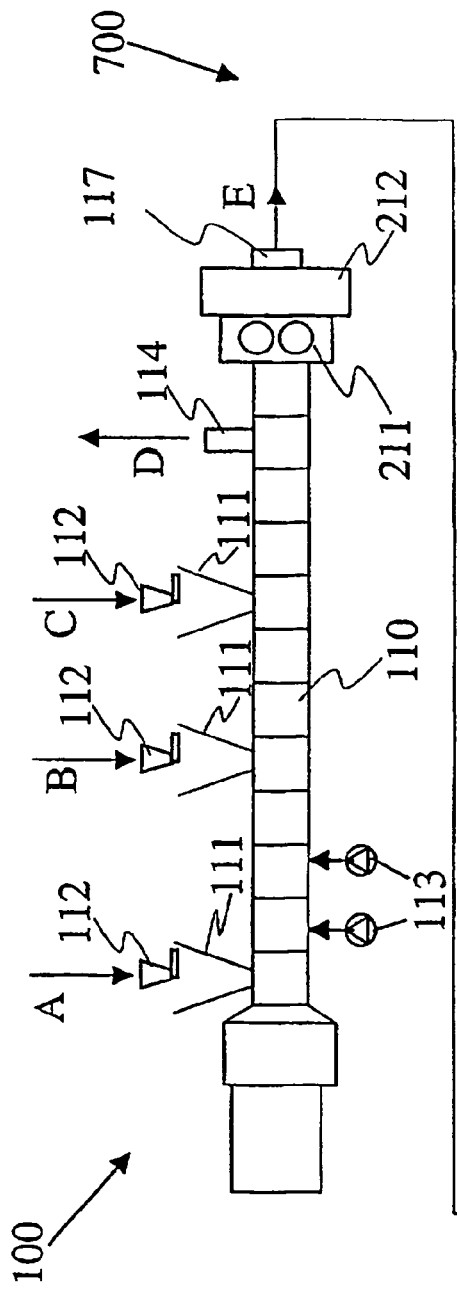
Figure 7:
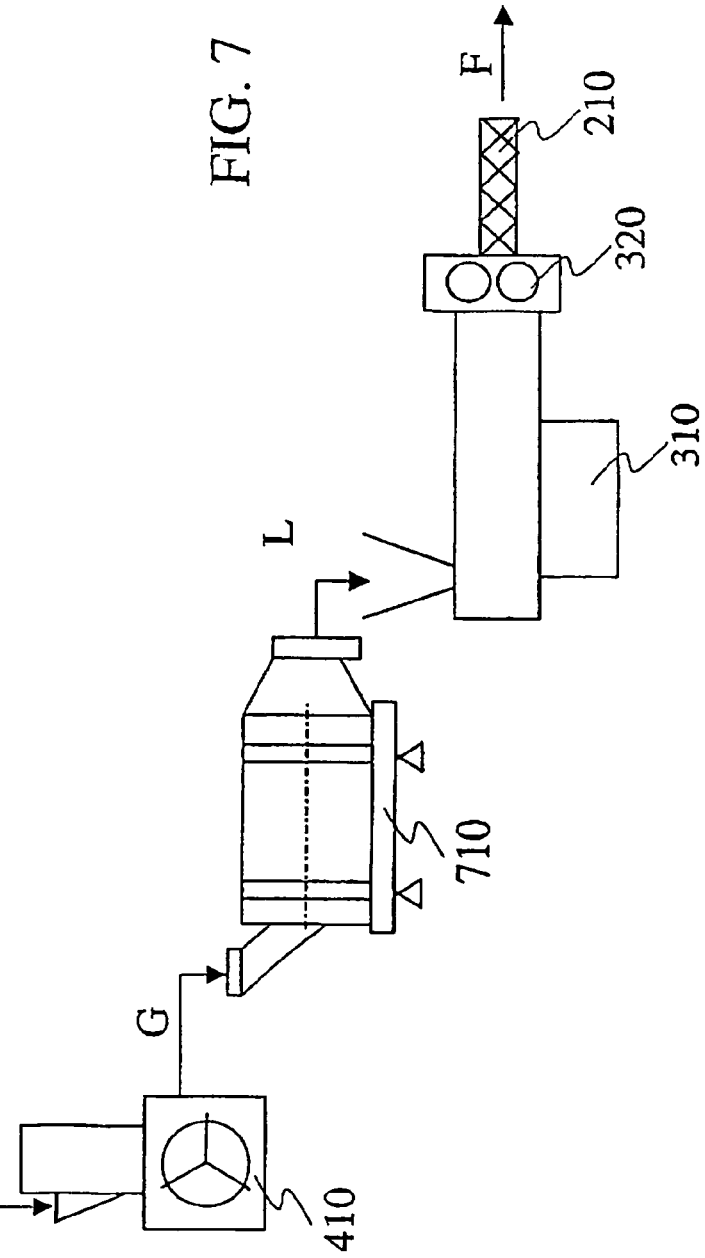

In details, FIG. 7 shows an embodiment of a continuous production plant 700 of the present invention according to which an amount of the subdivided product G exiting from the grinding device 410 is accumulated and stirred within a stirring device 710.

Preferably, the stirring device 710 is a rotating drum.

Preferably, the stirring step is carried out by continuously rotating the accumulated amount (e.g. by rotating the drum) so that subdivided products coming out from the grinding device 410 at different times are blended together.

The residence time of an elementary portion of the subdivided product (e.g. a granule) within the stirring device 710 depends on a plurality of parameters such as: a) volume of the stirring device; b) rate flow of the subdivided product G; c) speed of rotation of the drum, in case the stirring device is a rotating drum; d) filling degree of the stirring device.

For example, in the case the stirring device is a rotating drum, the flow rate of the subdivided product is comprised from about 50 kg/h to about 5,000 kg/h, the filling degree is of about 0.5, the drum volume is comprised from about 1 m$^3$ to about 5 m$^3$, and the speed of rotation is comprised from about 5 rpm to about 15 rpm (e.g. 6 rpm), the residence time of the subdivided product within the rotating drum is preferably in the range from 5 min to 15 min.

As shown in FIG. 7, at the end of the stirring step the stirred subdivided product L is discharged from the stirring device 710 and fed to the single-screw extruder 310. Thus the process is successively carried out as described above with reference to FIGS. 3 to 6.

Figure 8:
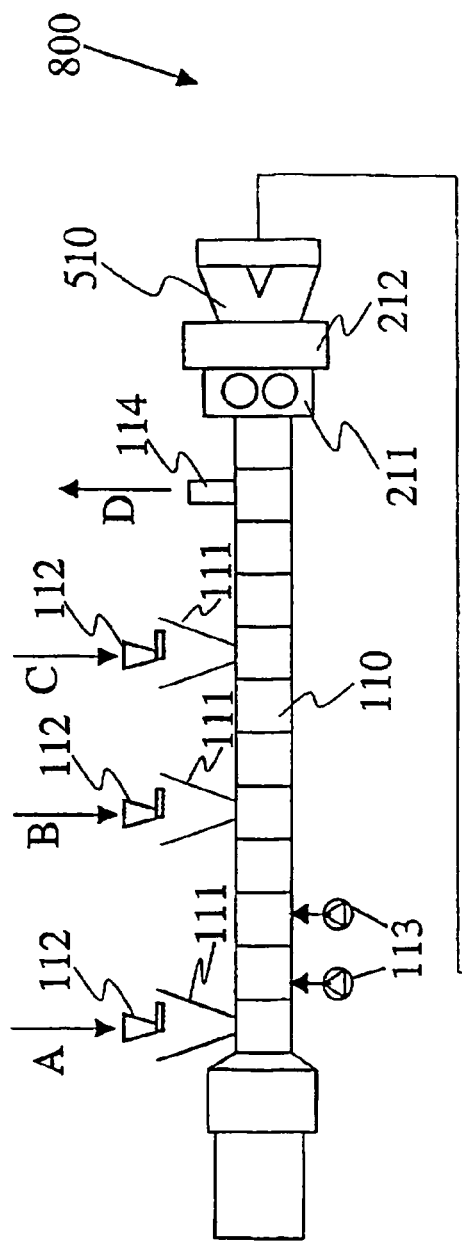
Figure 8:
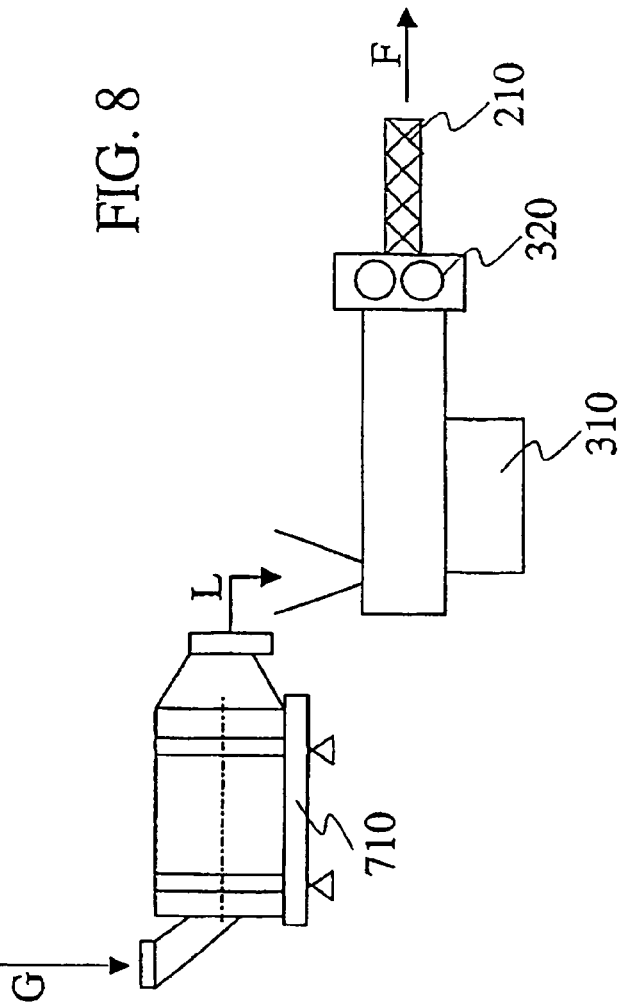

According to a further embodiment of the present invention, FIG. 8 shows a continuous production plant 800 wherein the step of obtaining an elastomeric composition in the subdivided form G is carried out directly at the discharging opening of the extruder 110 as described above with reference to FIG. 5.

According to a further embodiment, masterbatches of the minor ingredients are added to the resulting elastomeric composition (which is discharged from the extruder 110) inside of the stirring device 710.

Figure 9:
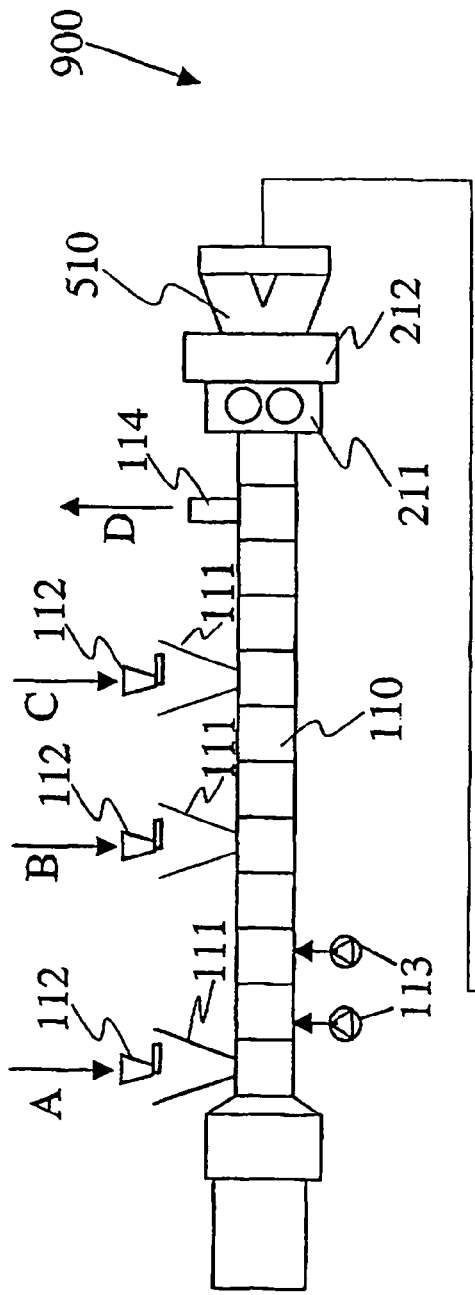
Figure 9:
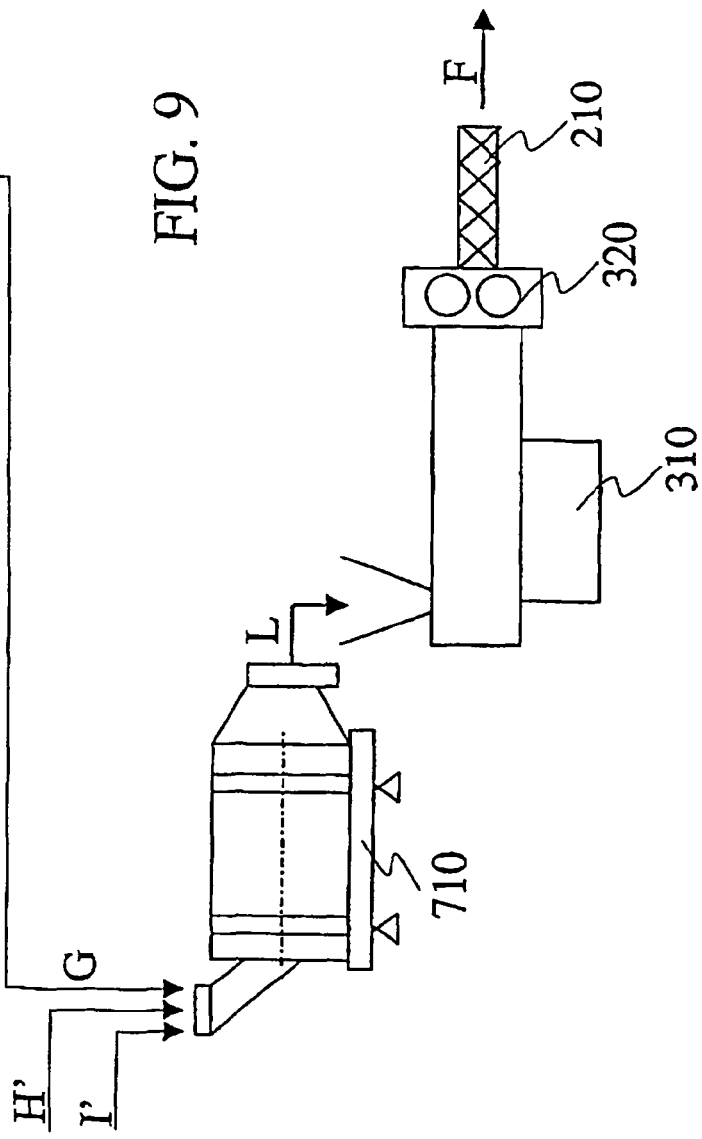

In details, FIG. 9 shows a continuous production plant 900 according to which two masterbatches H', I' of two minor ingredients in the subdivided form and the resulting elastomeric composition in the subdivided form G exiting from the extruder 110 are fed to the stirring device 710.

Figure 10:
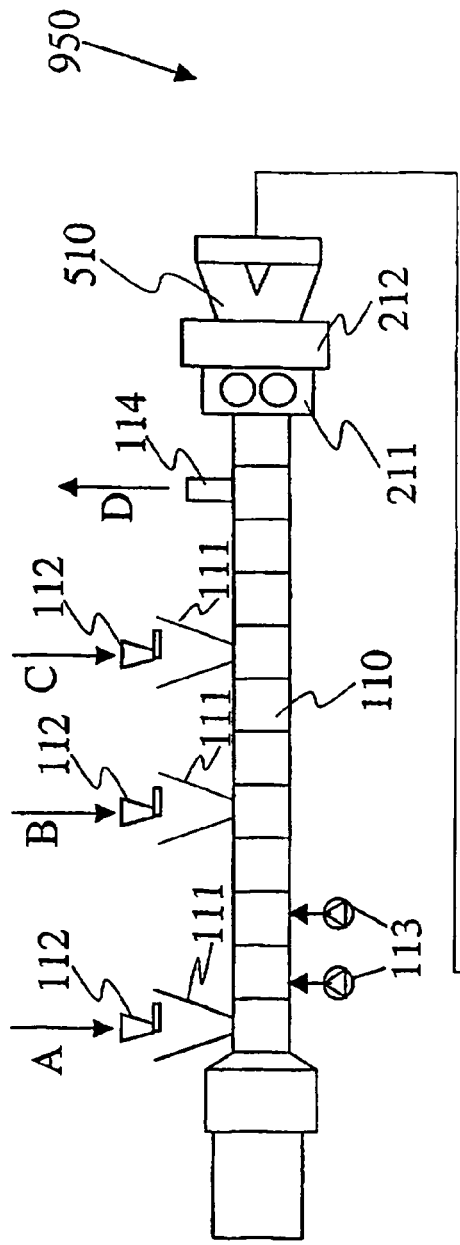
Figure 10:
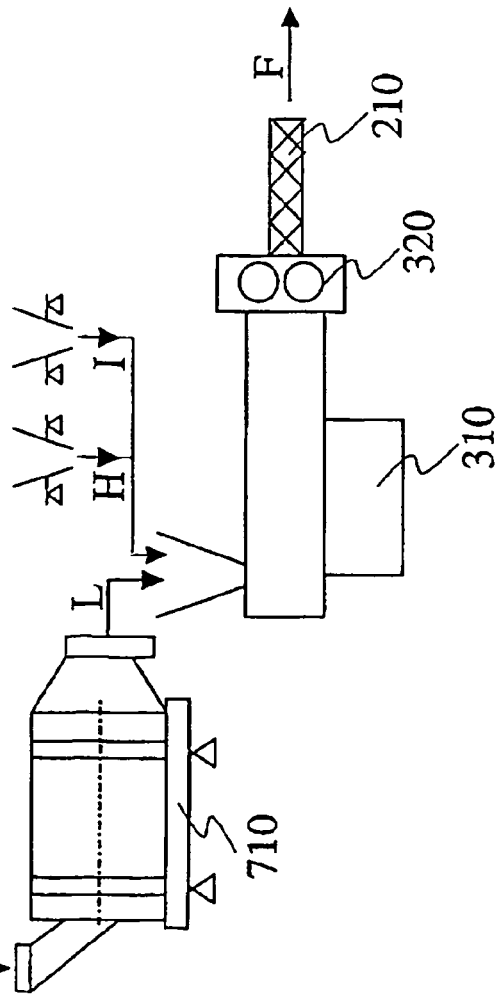

FIG. 10 shows a continuous production plant 950 of the present invention according to which the minor ingredients, or at least part of them, are added to the stirred elastomeric composition inside of the single-screw extruder.

According to said embodiment the elastomeric composition in the subdivided form G is stirred into the stirring device 710 and successively added to the minor ingredients H, I. Preferably, said minor ingredients H, I are in the form of masterbatches as described above. Preferably, said masterbatches are reduced in the subdivided form. Alternatively, said masterbatches are introduced (injected) into the single-screw extruder 310 in the form of a ribbon.

According to a preferred embodiment of the present invention, one or more recipe ingredients are fed to the respective metering devices in the subdivided form.

Preferably the minor ingredients are fed in the subdivided form.

According to a further embodiment of the present invention, one or more recipe ingredients are conveyed to respective metering devices by means of a pneumatic conveying line.

When a pneumatic conveying line is used, preferably at least one minor ingredient is provided to the production plant in a subdivided free-flowing form which is particularly suitable for the pneumatic conveying thereof.

Preferably said free-flowing properties as well as high dimensional regularity and stability are obtained by dispersing said at least one minor ingredient in a thermoplastic binding agent.

Moreover, the thermoplastic binding agent readily melts when introduced into the extruder, thus acting as a processing aid and remarkably improving the dispersion of said at least one minor ingredient into the rubber base, without causing any significant changes in the properties of the final elastomeric composition.

Minor ingredients which can be metered and fed to the extruder in the subdivided form may be selected, for instance, from:

(a1) crosslinking agents, such as:
sulfur (usually in a soluble crystalline form or in a insoluble polymeric form, optionally dispersed in an oily phase); sulfur donors (e.g. alkylthiuram disulfides); organic peroxides;

(a2) crosslinking accelerators, such as:
thiazoles, sulfenamides, guanidines, thiurams, dithiocarbamates, amines, xanthogenates;

(a3) synthetic resins, such as alpha-methylstyrene resins, cumarone resins;

(a4) crosslinking activators, such as zinc compounds (e.g. ZnO, $ZnCO_3$, fatty acid zinc salts);

(a5) crosslinking retardants, such as carboxylic acids, phthalimide derivatives, diphenylamine derivatives;

(a6) adhesion promoters, such as hexamethylentetramine (HMT), resorcinol;

(a7) protective agents, such as aromatic diamines (e.g. N-(1,3-dimethylbutyl)-N'-p-phenylendiamine (6PPD)), dihydrochinoline derivatives, imidazole derivatives;

(a8) coupling agents, such as coupling agents for silica, particularly sulfur-containing hydrolyzable silanes (e.g. 3,3'-bis(triethoxy-silylpropyl)tetrasulfide (TESPT));

(a9) condensation catalysts, such as metal carboxylates (e.g. dibutyltindilaurate (DBTL)).

The above list is given only to illustrate some examples of the most common minor ingredients used in rubber mixtures, particularly in rubber mixtures for tyres, and shall not be intended as limitative of the scope of the present invention.

The process according to the present invention may be employed to produce rubber mixture of any kind of elastomers, particularly of elastomers used in the tyre industry. Generally, the elastomeric base may be selected from: diene elastomeric polymers and mono-olefin elastomeric polymers, or mixtures thereof.

Diene elastomeric polymers are generally of natural origin, or may be obtained by polymerization, in solution or in emulsion, of at least one conjugated diolefin, optionally with at least one monovinylarene in an amount not exceeding 50% by weight. Examples of diene elastomeric polymers are: cis-1,4-polyisoprene (either natural or synthetic, preferably natural rubber), 3,4-polyisoprene, poly-1,3-butadiene (in particular, high vinyl poly-1,3-butadiene having a content of 1,2-polymerized units of from 15% to 85% by weight), polychloroprene, optionally halogenated isoprene/isobutene copolymers, 1,3-butadiene/acrylonitrile copolymers, 1,3-butadiene/styrene copolymers, 1,3-butadiene/isoprene copolymers, isoprene/styrene copolymers, isoprene/1,3-butadiene/styrene terpolymers; or mixtures thereof.

As to mono-olefin elastomeric polymers, they may be selected from: copolymers of ethylene with at least one alpha-olefin having from 3 to 12 carbon atoms, and optionally with a diene having from 4 to 12 carbon atoms; polyisobutene; copolymers of isobutene with at least one diene. Particularly preferred are: ethylene/propylene copolymers (EPR); ethylene/propylene/diene terpolymers (EPDM); polyisobutene; butyl rubbers; halobutyl rubbers; or mixtures thereof.

The rubber mixture further comprises at least one reinforcing filler, such as: carbon black, silica, alumina, aluminosilicates, calcium carbonate, kaolin, titanium dioxide, or mixtures thereof. Particularly preferred are carbon black and silica, or mixtures thereof. The amount of the reinforcing filler may be generally of from 0.1 to 120 phr, preferably from 20 to 90 phr (phr=parts by weight per 100 parts by weight of total elastomeric base).

To improve processability, at least one plasticizing agent is preferably added to the rubber mixtures. It is generally selected from mineral oils, vegetable oils, synthetic oils and the like, or mixtures thereof, for instance: aromatic oil, naphthene oil, phthalates, soybean oil, or mixtures thereof. The amount of the plasticizing agent may generally range from 2 to 100 phr, preferably from 5 to 50 phr.

The present invention is now further illustrated by the following working examples.

Example 1 (Invention)

An elastomeric composition was produced according to the schematic production process of FIG. 4.

Said elastomeric composition was prepared by using natural rubber (NR) and butadiene rubber (BR) as elastomeric base, and carbon black as reinforcing filler.

The recipe of the elastomeric composition is reported in Table 1 hereinbelow.

TABLE 1

| Ingredients | | phr |
|---|---|---|
| NR (STR 20) | | 50 |
| BR (polybutadiene Buna ® Cis-132 - Bayer) | | 50 |
| Carbon Black N660 | | 50 |
| Minor | Zinc Oxide | 3 |
| Ingredients | Wax | 2 |
| | Stearic Acid | 2 |
| | N-tertbutyl-mercaptobenzothiazyl sulphenamide (TBBS) | 0.8 |
| | Insoluble sulfur ($S_n$) | 1.8 |
| | N-cyclohexyl thiophtaloimide (PVI) | 0.3 |
| | Antioxidant (6PPD) | 2.5 |
| Total | | 162.4 |

The term "phr" indicates the parts by weight per 100 parts by weight of total rubber.

The natural rubber and the butadiene rubber were obtained in the form of granules, having an average particle size of about 1 cm, by means of two mills provided with rotating blades.

In order to prevent reagglomeration, the obtained granules of the two rubbers were dusted with silica.

Successively, a mechanical blending of the granules of the two rubbers was carried out and the blended granules of the two different rubbers were fed to a first feeding hopper (the main hopper) of a co-rotating intermeshing twin-screw extruder having a cylinder diameter of 58 mm and a L/D ratio of 48.

The feeding of said blended granules to the twin-screw extruder was carried out by means of a gravimetric feeder.

The minor ingredients in the form of powders were introduced at different zones of the twin-screw extruder.

About 50% by weight of the reinforcing filler, i.e. of the carbon black, was fed together with the granulated rubbers to the first feeding hopper of the twin-screw extruder by means of a dedicated gravimetric feeder.

The remaining part of carbon black as well as zinc oxide, wax and stearic acid were fed to a second feeding hopper of the twin-screw extruder by means of a different dedicated gravimetric feeder, i.e. a gravimetric feeder for each ingredient.

Insoluble sulphur, N-cyclohexyl thiophtaloimide (PVI) and N-tertbutyl mercaptobenzothiazyl sulphenamide (TBBS), i.e. the curatives, were fed to a further feeding hopper of the twin-screw extruder by means of dedicated gravimetric feeders.

Antioxidant 6PPD was injected in the molten state by means of a gravimetrically controlled feeding pump.

In order to determine the weight errors introduced by the feeding gravimetric system into the production process, each gravimetric feeder was provided with an on-line electronic control device which measured and displayed the instant flow of the recipe ingredient. If necessary, said control was able to correct the instant flow by acting on the feeding mechanism of the gravimetric feeder.

The extruded elastomeric composition was in the form of a continuous ribbon having width of about 10 cm and thickness of about 2 cm.

Said ribbon was fed to a mill provided with rotating blades so as to pelletize said ribbon in order to obtain elastomeric granules having average particle size of about 1 cm.

100 kg of elastomeric composition in the granular form was produced and dusted with silica in order to prevent reagglomeration.

Successively, said granules amount was fed to a single-screw extruder having a cylinder diameter of 50 mm and a L/D ratio of 12.

The single-screw extruder performed the step of feeding the elastomeric composition to a static mixer (Sulzer SMK-X DN 30 produced by Sulzer Chemtech Ltd.) for homogenizing the extrudate exiting from said single-screw extruder.

The elastomeric composition exiting from the static mixer was at a temperature of about 130° C. and was in the form of a rod having a diameter of about 3 cm.

Eight samples were obtained from said rod (each sample having a cylindrical form with length of about 25 mm and diameter of about 14 mm) and submitted to a curing step for 10 minutes at 170° C.

Successively said samples were tested to evaluate the following properties:

Mooney viscosity ML(1+4) at 100° C. according to Standard ISO 289/1;
  mechanical properties (100% Modulus, 300% Modulus, stress at break, elongation at break) according to ISO Standard 37;
  dynamic elastic properties, and
  hardness in IRHD degrees at 23° C. and 100° C. according to ISO Standard 48.

In Table 2 are reported the arithmetical mean values for each property of the tested samples.

The dynamic elastic properties were measured with a dynamic Instron device in the compression mode according to the following method. Each sample, compression-preloaded up to a 1ot longitudinal deformation with respect to the initial length and kept at the prefixed temperature (70° C. or 23° C.) for the whole duration of the test, was submitted to a dynamic sinusoidal strain having an amplitude of ±3.33% with respect to the length under pre-load, with a 100 Hz frequency. The dynamic elastic properties were expressed in terms of dynamic elastic modulus (E') and tandelta (loss factor) values. The tandelta value was calculated as a ratio between the viscous modulus (E") and the elastic modulus (E'), both of them being determined with the above dynamic measurements.

With reference to the samples mentioned above, for each of the tested property the Applicant calculated the root-mean-square deviation ($\sigma$) and the scattering coefficient (V) in order to quantify the scattering of the measured values from the average value.

TABLE 2

| Test | Average value | Root-mean-square deviation $\sigma$ | Scattering coefficient V (%) |
| --- | --- | --- | --- |
| Viscosity (ML 1 + 4 100° C.) | 45.40 | 0.634 | 1.41 |
| 100% Modulus (MPa) | 1.34 | 0.041 | 3.06 |
| 300% Modulus (MPa) | 6.25 | 0.289 | 4.62 |
| Stress at break (MPa) | 15.31 | 0.711 | 4.64 |
| Elongation at break (%) | 590.50 | 14.281 | 2.42 |
| E' (23° C.) (MPa) | 5.059 | 0.072 | 1.42 |
| E' (70° C.) (MPa) | 3.968 | 0.091 | 2.29 |
| Tan delta (23° C.) | 0.164 | 0.002 | 1.45 |
| Tan delta (70° C.) | 1.137 | 0.004 | 0.36 |
| IRHD Hardness (23° C.) | 53.20 | 0.532 | 1.00 |
| IRHD Hardness (100° C.) | 51.60 | 0.620 | 1.20 | wherein the scattering coefficient V is calculated as follows:

$$V = \frac{\sigma}{\bar{x}} \quad (1)$$

or $$V\% = 100 * \frac{\sigma}{\bar{x}} \quad (2)$$

wherein:
  $\bar{x}$ is the arithmetical mean of the measured values of the property x for all the samples, i.e.:

$$\bar{x} = \frac{1}{N}\sum_{i=1}^{N} x_i \quad (3)$$

N is the total number of samples which have been considered; and
  $\sigma$ is the root-mean-square deviation that is calculated as follows:

$$\sigma = \sqrt{\frac{\sum_{i=1}^{N}(x_i - \bar{x})^2}{N-1}} \quad (5)$$

Since the scattering coefficient V is directly proportional to the root-mean-square deviation $\sigma$, the greater is the value of V, the greater is the value of $\sigma$, i.e. the greater is the amplitude of the Gaussian curve centered in correspondence of the average value $\bar{x}$. Of course, the greater is the value of V, the greater is the inconsistency of the measured physical-chemical properties from sample to sample.

Example 2 (Invention)

The elastomeric composition of the Example 1 was processed in a continuous production plant of the type shown in FIG. 7.

Said elastomeric composition was submitted to the same production procedure and the same operating conditions of Example 1 except for the fact that the elastomeric composition in the granular form exiting from the mill was fed to a rotating drum.

100 kg of elastomeric composition in the granular form was produced and dusted with silica in order to prevent reagglomeration.

Successively, said granules amount was fed to said rotating drum having a capacity of 1,500 liters and stirred for 10 minutes at a rotation speed of about 25 rpm so as to homogenize the pelletized extrudate.

At the end of the stirring step, the rotating drum was stopped and the discharged granules were fed to the single-screw extruder associated to the static mixer, as described in Example 1.

Analogously to Example 1, the resulting elastomeric composition exiting from the static mixer was in the form of a rod of a diameter of about 3 cm, at a temperature of about 130° C.

Eight samples were obtained from said rod (each sample having a cylindrical form with length of about 25 mm and diameter of about 14 mm) and submitted to a curing step for 10 minutes at 170° C.

Successively, said samples were tested to evaluate the abovementioned properties (as described in Example 1), the results of which are reported in Table 3.

In Table 3 are reported the arithmetical mean values for each property of the tested samples.

TABLE 3

| Test | Average value | Root-mean-square deviation σ | Scattering coefficient V (%) |
| --- | --- | --- | --- |
| Viscosity (ML 1 + 4 100° C.) | 46.00 | 0.359 | 0.78 |
| 100% Modulus (MPa) | 1.55 | 0.017 | 1.10 |
| 300% Modulus (MPa) | 7.24 | 0.019 | 1.55 |
| Stress at break (MPa) | 14.81 | 0.376 | 2.54 |
| Elongation at break (%) | 538.20 | 13.616 | 2.53 |
| E' (23° C.) (MPa) | 4.89 | 0.129 | 2.64 |
| E' (70° C.) (MPa) | 4.02 | 0.088 | 2.19 |
| Tan delta (23° C.) | 0.148 | 0.003 | 1.35 |
| Tan delta (70° C.) | 0.113 | 0.002 | 1.77 |
| IRHD Hardness (23° C.) | 57.30 | 0.201 | 0.35 |
| IRHD Hardness (100° C.) | 53.60 | 0.247 | 0.46 |

Example 3 (Invention)

An elastomeric composition was produced according to the schematic production process of FIG. 9.

Said elastomeric composition was prepared by using natural rubber (NR) and butadiene rubber (BR) as elastomeric base, and carbon black as reinforcing filler.

The recipe of the elastomeric composition is reported in Table 4 hereinbelow.

TABLE 4

| Ingredients | | phr |
| --- | --- | --- |
| NR (STR 20) | | 50 |
| BR (polybutadiene Buna ® Cis-132 - Bayer) | | 50 |
| Carbon Black N660 | | 50 |
| Minor Ingredients | Zinc Oxide | 3 |
| | Wax | 2 |
| | Stearic Acid | 2 |
| | Antioxidant (6PPD) | 2.9 |
| | Total | 159.5 |

As described in Example 1, the natural rubber and the butadiene rubber, obtained in the form of granules, after blending were fed to a first feeding hopper (the main hopper) of a co-rotating intermeshing twin-screw extruder having a cylinder diameter of 58 mm and a L/D ratio of 48.

The minor ingredients indicated in Table 4 were introduced in the form of powders at different zones of the twin-screw extruder.

About 50% by weight of the reinforcing filler, i.e. of the carbon black, was fed together with the granulated rubbers to the first feeding hopper while the remaining part of carbon black as well as zinc oxide, wax and stearic acid were fed to a second feeding hopper of the twin-screw extruder.

Antioxidant 6PPD was injected in the molten state by means of a gravimetrically controlled feeding pump.

Insoluble sulphur, N-cyclohexyl thiophtaloimide (PVI) and N-tertbutyl mercaptobenzothiazyl sulphenamide (TBBS), i.e. the curatives, were not processed inside of the twin-screw extruder and were added to the resulting elastomeric composition, exiting from the twin-screw extruder, by means of two masterbatches having the compositions reported in Tables 5 and 6.

TABLE 5

| Masterbatch 1 | | phr |
| --- | --- | --- |
| Elastomeric composition from the twin-screw extruder | | 100 |
| Minor Ingredients | Insoluble sulfur ($S_n$) | 11.50 |
| | N-cyclohexyl thiophtaloimide (PVI) | 1.92 |
| | Total | 113.42 |

TABLE 6

| Masterbatch 2 | | phr |
| --- | --- | --- |
| Elastomeric composition from the twin-screw extruder | | 100 |
| Minor Ingredient | N-tertbutyl-mercaptobenzothiazyl sulphenamide (TBBS) | 5.74 |
| | Total | 105.74 |

Masterbatches 1 and 2 were prepared apart from the production plant shown in FIG. 9 by means of a further twin-screw extruder fed with the predetermined amount of elastomeric composition (exiting from the extruder) and the temperature sensitive minor ingredients according to the recipes reported in Tables 5 and 6 respectively.

Successively, masterbatches 1 and 2 were pelletized by using a cutting device so as to obtain granules having average particle size of about 5 mm.

The resulting elastomeric composition, exiting from the twin-screw extruder, was pelletized in order to obtain elastomeric granules having average particle size of about 1 cm. According to the embodiment described in FIG. 9, the elastomeric composition was pelletized directly at the discharging opening of the extruder by providing the extrusion head with a perforated die plate through which the elastomeric composition was caused to pass.

80 kg of the resulting elastomeric composition exiting from the twin-screw extruder, 10.93 kg of masterbatch 1 and 9.07 kg of masterbatch 2 (100 kg in total) were fed to a rotating drum having a capacity of 1,500 liters and stirred for 10 minutes at a rotation speed of about 25 rpm so as to homogenize the pelletized extrudate.

At the end of the stirring step, the rotating drum was stopped and the discharged granules were fed to the single-screw extruder associated to the static mixer, as described in Example 1.

Analogously to Example 1, the resulting elastomeric composition (exiting from the static mixer) was in the form of a rod of a diameter of about 3 cm, at a temperature of about 133° C.

Five samples were obtained from said rod (each sample having a cylindrical form with length of about 25 mm and diameter of about 14 mm) and submitted to a curing step for 10 minutes at 170° C.

Successively, said samples were tested to evaluate the abovementioned properties, the results of which are reported in Table 7.

In Table 7 are reported the arithmetical mean values for each property of the tested samples.

TABLE 7

| Test | Average value | Root-mean-square deviation $\sigma$ | Scattering coefficient V (%) |
|---|---|---|---|
| Viscosity (ML 1 + 4 100° C.) | 60.76 | 0.666 | 1.10 |
| 100% Modulus (MPa) | 1.59 | 0.022 | 1.38 |
| 300% Modulus (MPa) | 6.87 | 0.134 | 1.95 |
| Stress at break (MPa) | 14.64 | 0.625 | 4.27 |
| Elongation at break (%) | 560.60 | 19.835 | 3.46 |
| E' (23° C.) (MPa) | 4.918 | 0.055 | 1.12 |
| E' (70° C.) (MPa) | 4.061 | 0.028 | 0.69 |
| Tan delta (23° C.) | 0.162 | 0.003 | 1.85 |
| Tan delta (70° C.) | 0.132 | 0.001 | 0.76 |
| IRHD Hardness (23° C.) | 57.78 | 0.337 | 0.65 |
| IRHD Hardness (100° C.) | 52.04 | 0.757 | 1.45 |

Example 4 (Comparative)

The elastomeric composition of the Example 1 was metered and fed to a co-rotating intermeshing twin-screw extruder according to the continuous production plant shown in FIG. 1.

Said elastomeric composition was prepared by using natural rubber (NR) and butadiene rubber (BR) as elastomeric base, and carbon black as reinforcing filler.

The natural rubber and the butadiene rubber were obtained in the form of granules, having an average particle size of about 1 cm, by means of two mills provided with rotating blades.

In order to prevent reagglomeration, the obtained granules of the two rubbers were dusted with silica.

Successively, a mechanical blending of the granules of the two rubbers was carried out and the blended granules of the two different rubbers were fed to a first feeding hopper (the main hopper) of a co-rotating intermeshing twin-screw extruder having a cylinder diameter of 58 mm and a L/D ratio of 48.

The feeding of said blended granules to the twin-screw extruder was carried out by means of a gravimetric feeder.

The minor ingredients in the form of powders were introduced at different zones of the twin-screw extruder.

About 50% by weight of the reinforcing filler, i.e. of the carbon black, was fed together with the granulated rubbers to the first feeding hopper of the twin-screw extruder by means of a dedicated gravimetric feeder.

The remaining part of carbon black as well as zinc oxide, wax and stearic acid were fed to a second feeding hopper of the twin-screw extruder by means of a different dedicated gravimetric feeder, i.e. a gravimetric feeder for each ingredient.

Insoluble sulphur, N-cyclohexyl thiophtaloimide (PVI) and N-tertbutyl mercaptobenzothiazyl sulphenamide (TBBS), i.e. the curatives, were fed to a further feeding hopper of the twin-screw extruder by means of dedicated gravimetric feeders.

Antioxidant 6PPD was injected in the molten state by means of a gravimetrically controlled feeding pump.

The extruded elastomeric composition was in the form of a continuous ribbon having width of about 10 cm and thickness of about 2 cm. The temperature of the extrudate was of about 126° C.

From said ribbon ten samples were obtained, submitted to curing for 10 min at 170° C. and tested to evaluate the physical-chemical properties thereof.

The results are reported in Table 8.

TABLE 8

| Test | Average value | Root-mean-square deviation $\sigma$ | Scattering coefficient V (%) |
|---|---|---|---|
| Viscosity (ML 1 + 4 100° C.) | 40.932 | 1.533 | 3.75 |
| 100% Modulus (MPa) | 1.529 | 0.149 | 9.74 |
| 300% Modulus (MPa) | 7.113 | 0.652 | 9.17 |
| Stress at break (MPa) | 14.772 | 0.661 | 4.47 |
| Elongation at break (%) | 546.190 | 36.070 | 6.60 |
| E' (23° C.) (MPa) | 4.99 | 0.123 | 2.46 |
| E' (70° C.) (MPa) | 3.96 | 0.128 | 3.23 |
| Tan delta (23° C.) | 0.161 | 0.004 | 2.48 |
| Tan delta (70° C.) | 1.130 | 0.009 | 6.92 |
| IRHD Hardness (23° C.) | 56.070 | 1.818 | 3.24 |
| IRHD Hardness (100° C.) | 52.260 | 1.891 | 3.62 |

By comparing the values reported in Tables 2, 3, 7 and 8, it can be pointed out that the scattering coefficients V relative to the measured physical-chemical properties of the elastomeric samples obtained with the production processes of the present invention are remarkably lower than the corresponding scattering coefficients V of the elastomeric samples obtained with a traditional production process.

As mentioned above, the fact that the scattering coefficients V can be notably reduced is particularly advantageous since very low scattering coefficients mean that the physical-chemical properties of the elastomeric composition obtained from the production process according to the present invention are substantially consistent during the whole duration of the production campaign.

This means that elastomeric manufactured products obtained from the same recipe at different moments of the production process are expected to show uniformity of properties as well as high quality consistency so that substantially the same behaviour can be ensured from product to product belonging to the same production campaign.

Furthermore, if compared to prior art continuous processes provided with two twin-screw extruders, the continuous production process according to the present invention gives good results in terms of scattering of the physical-chemical properties of the resulting elastomeric composition and is advantageously less expensive and less complex to be carried out.

The invention claimed is:

1. A process for producing tires including continuously producing tire elastomeric composition, comprising:
    metering and feeding at least one elastomer and at least one filler into at least one extruder;
    mixing and dispersing the at least one filler into the at least one elastomer using the at least one extruder;
    discharging a resulting elastomeric composition from the at least one extruder;
    cooling the resulting elastomeric composition discharged from the at least one extruder;
    adding at least one temperature sensitive minor ingredient to the resulting cooled elastomeric composition; and
    mixing and dispersing the at least one temperature sensitive minor ingredient into the resulting cooled elastomeric composition using at least one static mixer,
    wherein the at least one temperature sensitive minor ingredient is in a form of a masterbatch, the masterbatch comprising:
        the at least one temperature sensitive minor ingredient; and
        the resulting elastomeric composition discharged from the at least one extruder.

2. The process of claim 1, wherein the resulting elastomeric composition is cooled down at a temperature less than or equal to 110° C.

3. The process of claim 1, wherein the resulting elastomeric composition is cooled down at a temperature greater than or equal to 20° C. and less than or equal to 90° C.

4. The process of claim 1, further comprising:
    metering and feeding at least one minor ingredient into the at least one extruder.

5. The process of claim 4, further comprising:
    mixing and dispersing the at least one minor ingredient into the at least one elastomer using the at least one extruder.

6. The process of claim 4, wherein the at least one minor ingredient is selected from: crosslinking agents, crosslinking accelerators, resins, crosslinking activators, crosslinking retardants, adhesion promoters, protective agents, coupling agents, and condensation catalysts.

7. The process of claim 4, wherein the at least one minor ingredient is in a form of a subdivided product.

8. The process of claim 4, wherein the at least one minor ingredient is in a form of a powder.

9. The process of claim 4, wherein the at least one minor ingredient is in a form of a masterbatch.

10. The process of claim 9, wherein the masterbatch is obtained in a form of a subdivided product.

11. The process of claim 10, further comprising:
    accumulating an amount of the subdivided product; and
    stirring the accumulated amount.

12. The process of claim 9, wherein the masterbatch comprises:
    the at least one minor ingredient; and
    the resulting elastomeric composition.

13. The process of claim 12, wherein the masterbatch is obtained in a form of a subdivided product.

14. The process of claim 13, further comprising:
    accumulating an amount of the subdivided product; and
    stirring the accumulated amount.

15. The process of claim 1, wherein the at least one temperature sensitive minor ingredient is selected from: crosslinking agents, crosslinking accelerators, resins, crosslinking activators, crosslinking retardants, adhesion promoters, protective agents, coupling agents, and condensation catalysts.

16. The process of claim 1, wherein the at least one temperature sensitive minor ingredient is in a form of a subdivided product.

17. The process of claim 1, wherein the at least one temperature sensitive minor ingredient is in a form of a powder.

18. The process of claim 1, wherein the masterbatch is obtained in a form of a subdivided product.

19. The process of claim 18, further comprising:
    accumulating an amount of the subdivided product; and
    stirring the accumulated amount.

20. The process of claim 1, wherein the masterbatch is obtained in a form of a subdivided product.

21. The process of claim 20, further comprising:
    accumulating an amount of the subdivided product; and
    stirring the accumulated amount.

22. The process of claim 1, further comprising:
    obtaining a subdivided product from the resulting elastomeric composition discharged from the at least one extruder.

23. The process of claim 22, wherein obtaining the subdivided product is carried out at a discharge opening of the at least one extruder.

24. The process of claim 1, further comprising:
    obtaining a subdivided product from the resulting elastomeric composition discharged from the at least one extruder;
    wherein obtaining the subdivided product is carried out after cooling the resulting elastomeric composition.

25. The process of claim 22, further comprising:
    accumulating an amount of the subdivided product; and
    stirring the accumulated amount.

26. The process of claim 1, further comprising:
    adding at least one minor ingredient to the resulting elastomeric composition discharged from the at least one extruder;
    obtaining a subdivided product from the resulting elastomeric composition discharged from the at least one extruder;
    accumulating an amount of the subdivided product; and
    stirring the accumulated amount;
    wherein adding the at least one minor ingredient is carried out before accumulating an amount of the subdivided product and stirring the accumulated amount.

27. The process of claim 1, further comprising:
adding at least one minor ingredient to the resulting elastomeric composition discharged from the at least one extruder;
obtaining a subdivided product from the resulting elastomeric composition discharged from the at least one extruder;
accumulating an amount of the subdivided product; and
stirring the accumulated amount;
wherein adding the at least one minor ingredient is carried out after accumulating an amount of the subdivided product and stirring the accumulated amount.

28. The process of claim 1, further comprising:
discharging the elastomeric composition from the at least one static mixer.

29. The process of claim 28, wherein discharging the elastomeric composition is carried out continuously.

30. The process of claim 28, wherein discharging the elastomeric composition is carried out batchwise.

31. A process for producing tires including continuously producing a tire elastomeric composition, comprising:
metering and feeding at least one elastomer and at least one filler into at least one extruder;
mixing and dispersing the at least one filler into the at least one elastomer using the at least one extruder;
discharging a resulting elastomeric composition from the at least one extruder;
cooling the resulting elastomeric composition discharged from the at least one extruder;
producing a masterbatch comprising at least one temperature sensitive minor ingredient and the resulting elastomeric composition discharged from the at least one extruder in a form of a subdivided product;
accumulating an amount of the subdivided product; and
stirring the accumulated amount;
adding said stirred accumulated amount of the subdivided product to the resulting cooled elastomeric composition by introducing said stirred accumulated amount to a feeding and pumping device of at least one static mixer together with the resulting cooled elastomeric composition; and
passing the resulting cooled elastomeric composition and said stirred accumulated amount through the at least one static mixer.

32. A process for producing tires including continuously producing a tire elastomeric composition, comprising:
metering and feeding at least one elastomer and at least one filler into at least one extruder;
mixing and dispersing the at least one filler into the at least one elastomer using the at least one extruder;
discharging a resulting elastomeric composition from the at least one extruder;
obtaining a subdivided product from the resulting elastomeric composition discharged from the at least one extruder cooling the resulting elastomeric composition discharged from the at least one extruder;
producing a masterbatch comprising at least one temperature sensitive minor ingredient and an amount of the subdivided product from the resulting elastomeric composition;
and
passing the resulting cooled elastomeric composition and the masterbatch through at least one static mixer.

33. The process of claim 32 wherein the cooling of the resulting elastomeric composition discharged from the at least one extruder is carried out after obtaining a subdivided product from the resulting elastomeric composition.

34. The process of claim 32 wherein the cooling of the resulting elastomeric composition discharged from the at least one extruder is carried out before obtaining a subdivided product from the resulting elastomeric composition.

* * * * *

UNITED STATES PATENT AND TRADEMARK OFFICE
CERTIFICATE OF CORRECTION

PATENT NO.         : 8,236,215 B2
APPLICATION NO.    : 10/520530
DATED              : August 7, 2012
INVENTOR(S)        : Maurizio Galimberti et al.

It is certified that error appears in the above-identified patent and that said Letters Patent is hereby corrected as shown below:

In claim 32, column 24, line 19, "extruder cooling" should read --extruder; cooling--.

Signed and Sealed this
Fifth Day of February, 2013

Teresa Stanek Rea
*Acting Director of the United States Patent and Trademark Office*